United States Patent
Fujii et al.

(10) Patent No.: US 8,432,792 B2
(45) Date of Patent: Apr. 30, 2013

(54) NODE APPARATUS, RING NETWORK, AND PROTECTION PATH BANDWIDTH CONTROL METHOD

(75) Inventors: Yasuki Fujii, Kawasaki (JP); Yuji Tochio, Kawasaki (JP); Shinya Kano, Kawasaki (JP); Ryoichi Mutoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 613 days.

(21) Appl. No.: 12/618,187

(22) Filed: Nov. 13, 2009

(65) Prior Publication Data

US 2010/0188970 A1 Jul. 29, 2010

(30) Foreign Application Priority Data

Jan. 28, 2009 (JP) ................................. 2009-017032

(51) Int. Cl.
*G08C 15/00* (2006.01)
(52) U.S. Cl.
USPC .......................................................... 370/222
(58) Field of Classification Search ................... 370/222
See application file for complete search history.

(56) References Cited

U.S. PATENT DOCUMENTS

| | | | |
|---|---|---|---|
| 5,469,428 A * | 11/1995 | Tokura et al. ................. | 370/224 |
| 6,657,952 B1 | 12/2003 | Shiragaki | |
| 6,934,248 B1 * | 8/2005 | DeBoer et al. ................ | 370/217 |
| 2007/0036073 A1 | 2/2007 | Yamada | |
| 2007/0076755 A1 * | 4/2007 | Sato et al. ...................... | 370/468 |

FOREIGN PATENT DOCUMENTS

| | | |
|---|---|---|
| JP | 11-163911 A | 6/1999 |
| JP | 2001-36558 A | 2/2001 |
| JP | 2007-049573 A | 2/2007 |

OTHER PUBLICATIONS

Helvoort, Huub V. et al.,"Draft ITU-T Rec.G.8132/Y.1382(T-MPLS shared protection ring)", Feb. 11, 2008.
Japanese Office Action mailed Jan. 15, 2013 for corresponding Japanese Application No. 2009-017032, with Partial English-language Translation.
Okada, Mitsumasa et al, "A Study for VP Protection Switching on ATM Ring Network Architecture," The Institute of Electronics, Information and Communication Engineers (IEICE) Technical Report, IN99-7 CS99-7 MVE99-7, Apr. 20, 199, pp. 1-7, with Partial English-language Translation.

* cited by examiner

*Primary Examiner* — Jason Mattis
*Assistant Examiner* — Stephen J Clawson
(74) *Attorney, Agent, or Firm* — Fujitsu Patent Center

(57) ABSTRACT

A node apparatus in a ring network in which a protection path is provided that cycles around the ring network and transports a signal in a direction opposite to a signal transporting direction of the working path and in the event of a failure of the working path, a node apparatus adjacent to the failure loops back the signal flowing on the working path onto the protection path, the node apparatus comprising: allowable bandwidth storing unit which stores a maximum total bandwidth value, which represents the largest value among per-link total values of bandwidths that a plurality of working paths use on respective links connecting between the node apparatuses, as an allowable bandwidth for a shared path; and bandwidth control unit which controls the bandwidth of traffic flowing on the protection path, in accordance with the allowable bandwidth.

5 Claims, 17 Drawing Sheets

FIG.1
Related Art
(A) 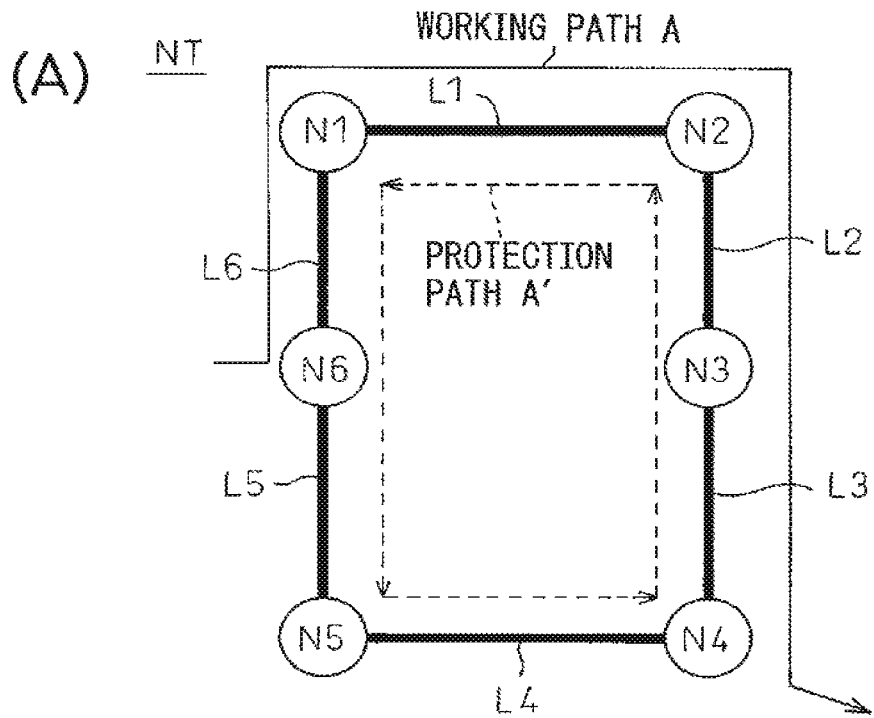
(B) 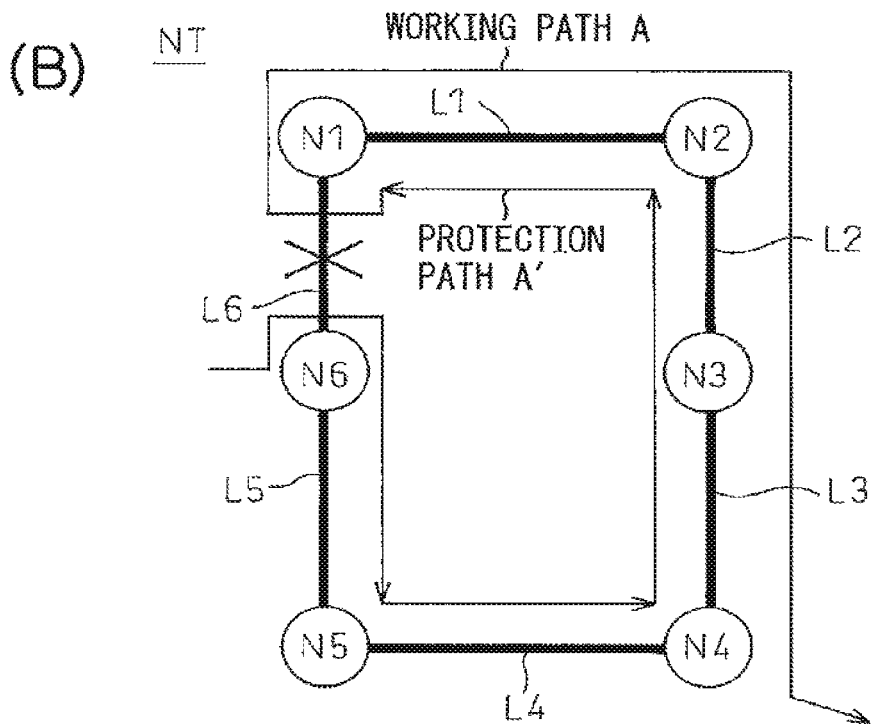

| PATH ID | INPUT PORT | OUTPUT PORT | ALTERNATE PORT | CORRESPONDING PATH ID |
|---------|------------|-------------|----------------|----------------------|
| A | PORT 1 | PORT 2 | PORT 1 | A' |
| A' | PORT 2 | PORT 1 | PORT 2 | A |
| B | PORT 1 | PORT 2 | PORT 1 | B' |
| B' | PORT 2 | PORT 1 | PORT 2 | B |
| P | PORT 2 | PORT 1 | – | – |
| ⋮ | ⋮ | ⋮ | ⋮ | ⋮ |

| QUEUE | ALLOWABLE BANDWIDTH |
|-------|---------------------|
| QUEUE 1 | 120M |
| QUEUE 2 | 50M |
| QUEUE 3 | 70M |
| ⋮ | ⋮ |

| PATH ID | ASSOCIATED QUEUE |
|---------|------------------|
| A | QUEUE 2 |
| A' | QUEUE 1 |
| B | QUEUE 3 |
| B' | QUEUE 1 |
| ⋮ | ⋮ |

T3

| PATH ID | ASSOCIATED QUEUE |
|---------|------------------|
| P | QUEUE 1 |
| ⋮ | ⋮ |

T4

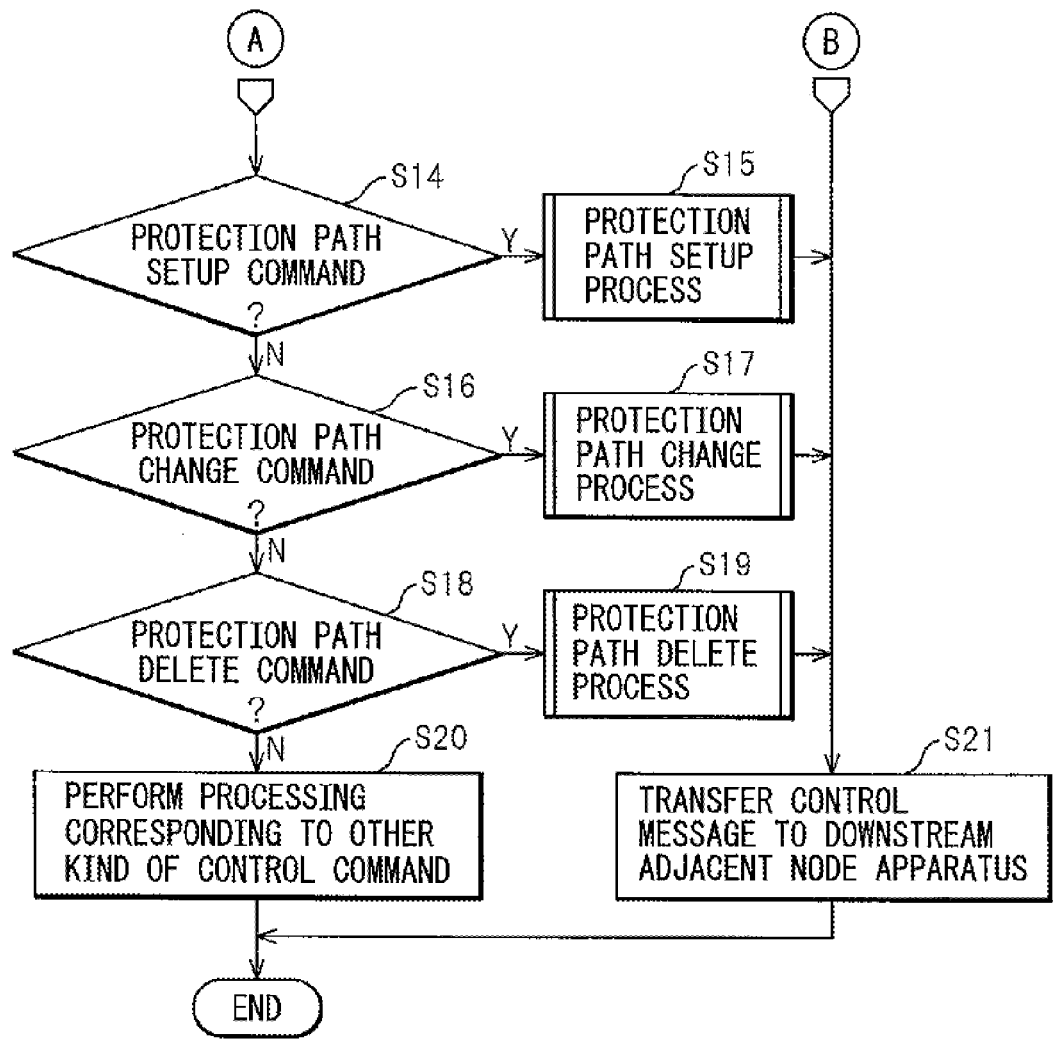

FIG.14

| KIND CODE | PATH ID | ROUTING INFORMATION | BANDWIDTH INFORMATION |
|---|---|---|---|

FIG.15

| KIND CODE | PATH ID | ROUTING INFORMATION | BANDWIDTH INFORMATION | WORKING PATH ID | SHARED PATH ID |
|---|---|---|---|---|---|

FIG.16

| KIND CODE | PATH ID | ROUTING INFORMATION | BANDWIDTH INFORMATION | SHARED PATH ID |
|---|---|---|---|---|

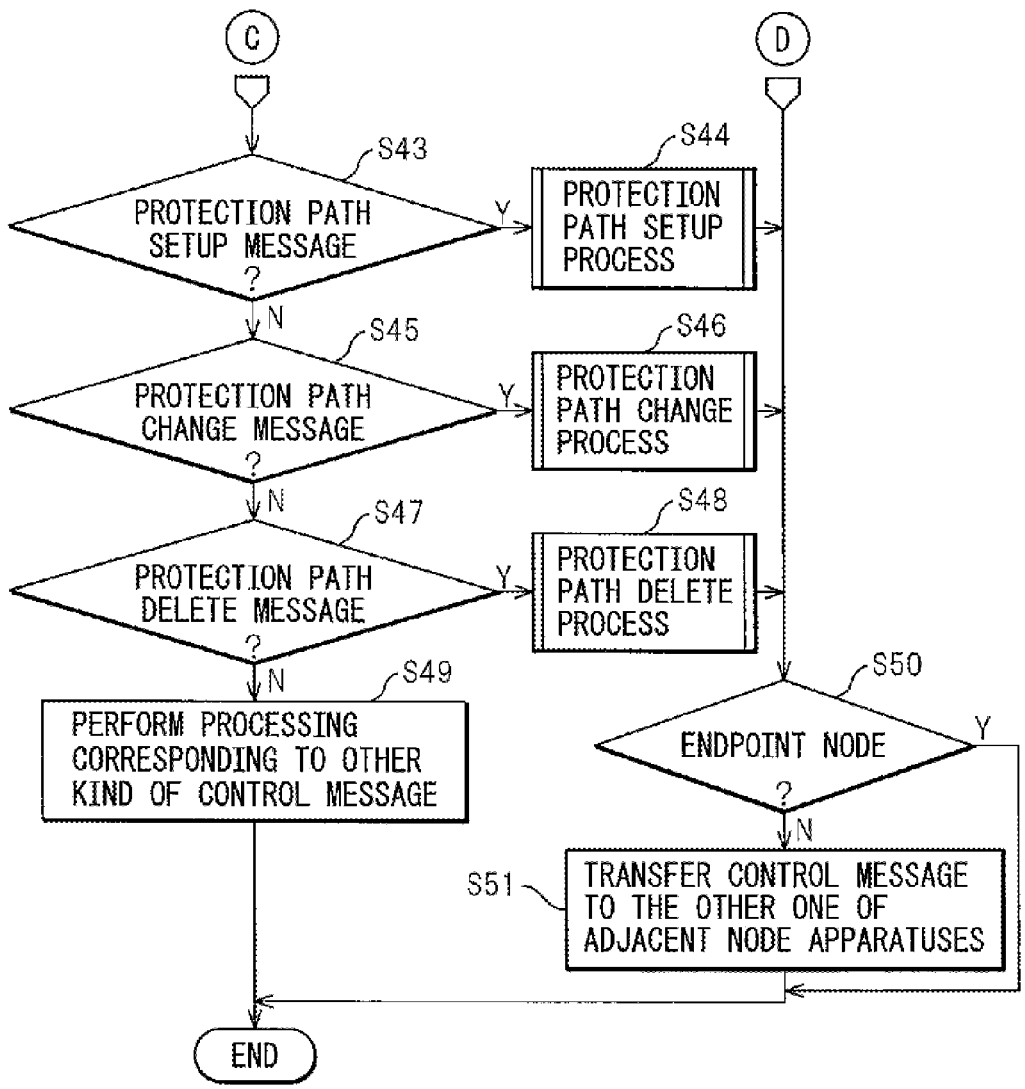

FIG.20

| KIND CODE | PATH ID | ROUTING INFORMATION | BANDWIDTH INFORMATION |
|---|---|---|---|

FIG.21

| KIND CODE | PATH ID | ROUTING INFORMATION | BANDWIDTH INFORMATION | WORKING PATH ID | SHARED PATH ID |
|---|---|---|---|---|---|

FIG.22

| KIND CODE | PATH ID | ROUTING INFORMATION | BANDWIDTH INFORMATION | SHARED PATH ID |
|---|---|---|---|---|

FIG.25

| KIND CODE | PATH ID | ROUTING INFORMATION | BANDWIDTH INFORMATION | PROTECTION PATH ID | TENTATIVE MAXIMUM BANDWIDTH INFORMATION |

NODE APPARATUS, RING NETWORK, AND PROTECTION PATH BANDWIDTH CONTROL METHOD

CROSS-REFERENCE TO RELATED APPLICATIONS

This application is based upon and claims the benefit of priority of the prior Japanese Patent Application No. 2009-17032, filed on Jan. 28, 2009, the entire contents of which are incorporated herein by reference.

FIELD

The embodiment(s) discussed herein is(are) related to a method for controlling a protection path to be used for wrapping control in a ring network in which a plurality of node apparatuses are connected in a ring configuration.

BACKGROUND

FIG. 1A is an explanatory diagram illustrating one example of a prior art protection path setup method used in a ring network constructed by connecting a plurality of node apparatuses in a ring configuration. The ring network NT includes the plurality of node apparatuses N1 to N6, and links L1 to L6 connecting between the adjacent node apparatuses N1 and N2, N2 and N3, N3 and N4, N4 and N5, N5 and N6, and N6 and N1, respectively. The node apparatuses N1 to N6 are connected in a ring configuration by the links L1 to L6.

To provide protection by wrapping control for a working path A passing through the ring network NT, the ring network NT provides a protection path A' that has the same bandwidth as the working path A and that cycles around the ring network NT in a direction opposite to the signal transporting direction of the working path A. In the event of a failure of the working path A, one of the node apparatuses adjacent to the failure wraps the signal flowing on the working path back onto the protection path, that is, the signal is looped back. Then, the signal is transported up to the other node apparatus adjacent to the failure by using the protection path A' that transports the signal in the direction opposite to the working path A, thereby making it possible to circumvent the failure. The other node apparatus adjacent to the failure loops back the signal flowing on the protection path onto the working path, and the signal is thus transported over the working path to the designated endpoint node.

FIG. 1B is an explanatory diagram illustrating how wrapping control is performed in the event of a failure. It is assumed here that a failure has occurred on the link L6 through which the working path A passes. One node apparatus N6 adjacent to the failure loops back the signal flowing on the working path A onto the protection path A'. The protection path A' transports the signal via the node apparatuses N6, N5, N4, N3, N2, and N1 in this order in the direction opposite to the signal transporting direction of the working path A. The other node apparatus N1 adjacent to the failure loops back the signal flowing on the protection path A' onto the working path A. Then, the working path A transports the signal up to the endpoint node N4 via the node apparatuses N1, N2, N3, and N4 in this order.

In the prior art wrapping control, the ring network provides a dedicated protection path for each working path. FIG. 2 is an explanatory diagram illustrating one example of the prior art protection path setup method when there are a plurality of working paths. In the illustrated ring network NT, the working paths A, B, and C having bandwidths of 50 Mbps, 70 Mbps, and 100 Mbps, respectively, are set up. The working path A is set up from the startpoint node apparatus N6 to the endpoint node N4 by passing through the node apparatuses N6, N1, N2, N3, and N4 in this order. The working path B is set up from the startpoint node apparatus N3 to the endpoint node N5 by passing through the node apparatuses N3, N4, and N5 in this order. The working path C is set up from the startpoint node apparatus N6 to the endpoint node N2 by passing through the node apparatuses N6, N1, and N2 in this order. In the ring network NT, protection paths A', B', and C' are provided in a one-to-one corresponding relationship to the working paths A, B, and C.

A communication network has been proposed that performs failure recovery in the following manner in a first communication in which a signal is inserted at the i-th communication node of a plurality of communication nodes and terminated at the j-th communication node around a first ring. When a failure of the first communication is detected, the j-th communication node sends a request message to the i-th communication node to reroute the first communication along a second ring. Upon receiving the request message, the i-th communication node switches the communication path of the first communication from the first ring to the second ring, thereby accomplishing failure recovery of the first communication. Further, the communication network performs failure recovery in the following manner in a second communication in which a signal is inserted at the m-th communication node of the plurality of communication nodes and terminated at the n-th communication node around a third ring. When a failure of the second communication is detected, the n-th communication node sends a request message to the m-th communication node to reroute the second communication along a fourth ring. Upon receiving the request message, the m-th communication node switches the communication path of the second communication from the third ring to the fourth ring, thereby accomplishing failure recovery of the second communication.

On the other hand, in a network system in which data is transferred over a path predefined between nodes, there is proposed a connection-type network node, such as described below, that can be a startpoint node of a protection path that provides a bypass route for a protection section contained in the working path. This connection-type network node includes a bandwidth usage amount determining unit and a generating unit. When setting up a protection path, the bandwidth usage amount determining unit determines the amount of bandwidth usage of the protection path to be set up, based on the working path that contains the protection section to be protected by that protection path. When the sum of the thus determined bandwidth usage and the current protection path bandwidth usage of an interface that transmits the data out onto that protection path does not exceed the usable amount of protection path bandwidth predetermined for that interface, the generating unit generates a signaling message for setting up the protection path.

There is also a redundancy protection mechanism and automatic protection switching (APS) that has been proposed in which a shared protection ring is applied to a T-MPLS (Transport MPLS) layer network defined in ITU-T Recommendations G.8110.

[Patent document 1] Japanese Unexamined Patent Publication No. H11-163911
[Patent document 2] Japanese Unexamined Patent Publication No. 2007-49573

[Non-patent document 1] "Draft ITU-T Rec. G8132/Y.1382 (T-MPLS shared protection ring)," February 2008, International Telecommunication Union—Telecommunication Standardization Sector

SUMMARY

The protection path setup method described with reference to FIG. 2 has been inefficient in the utilization of network bandwidth resources because a larger bandwidth than would normally be necessary has been reserved for the protection paths. That is, the total bandwidth that would normally be necessary in order to reserve the same bandwidth resources for the protection paths as for the working paths would be given by the largest value among the per-link total values of the bandwidths that the working paths use on the respective links, but in the above protection path setup method, a larger bandwidth than this largest value has been provided for the protection paths.

For example, in the example of FIG. 2, when the working paths A to C are set up in the ring network NT, the largest value among the total values of the bandwidths used by the working paths A to C is 150 Mbps which is used on the links L1 and L6. However, in the ring network NT, bandwidth resources amounting to 220 Mbps in total are reserved for the protection paths A' to C'.

According to an embodiment, a protection path setup method is provided for a ring network in which a plurality of node apparatuses are connected in a ring configuration, and in which, to provide protection for a working path passing through the ring network, a protection path is provided that cycles around the ring network and that transports a signal in a direction opposite to the signal transporting direction of the working path and, in the event of a failure of the working path, a node apparatus adjacent to the failure loops back the signal flowing on the working path onto the protection path.

In this method, at each of the node apparatuses, a maximum total bandwidth value, which represents the largest value among the per-link total values of the bandwidths that a plurality of working paths use on respective links connecting between the respective node apparatuses, is stored in a prescribed storing unit as an allowable bandwidth for a shared path provided to be shared as a protection path among the plurality of working paths, and at each of the node apparatuses, the bandwidth of traffic flowing on the protection path is controlled in accordance with the allowable bandwidth.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTIONS OF THE DRAWINGS

FIG. 1A is an explanatory diagram (part 1) illustrating one example of a prior art protection path setup method;

FIG. 1B is an explanatory diagram illustrating how wrapping control is performed in the event of a failure;

FIG. 6 is a diagram illustrating one example of the data structure of a transfer table depicted in FIG. 5;

FIG. 7 is a diagram illustrating one example of the data structure of a queue table depicted in FIG. 5;

FIG. 12 is a flowchart (part 2) illustrating one example of the processing performed when a control command is received from the NMS;

FIG. 13 is a diagram illustrating one example of the data structure of instruction information contained in a working path setup command;

FIG. 14 is a diagram illustrating one example of the data structure of instruction information contained in a working path change command;

FIG. 15 is a diagram illustrating one example of the data structure of instruction information contained in a protection path setup command;

FIG. 16 is a diagram illustrating one example of the data structure of instruction information contained in a protection path change command;

FIG. 18 is a flowchart (part 2) illustrating one example of the processing performed when a control message is received;

FIG. 19 is a diagram illustrating a first example of the data structure of instruction information contained in a working path setup message;

FIG. 20 is a diagram illustrating one example of the data structure of instruction information contained in a working path change message;

FIG. 21 is a diagram illustrating one example of the data structure of instruction information contained in a protection path setup message;

FIG. 22 is a diagram illustrating one example of the data structure of instruction information contained in a protection path change message;

FIG. 25 is a diagram illustrating a second example of the data structure of the instruction information contained in the working path setup message.

DESCRIPTION OF EMBODIMENT(S)

Figure 2:
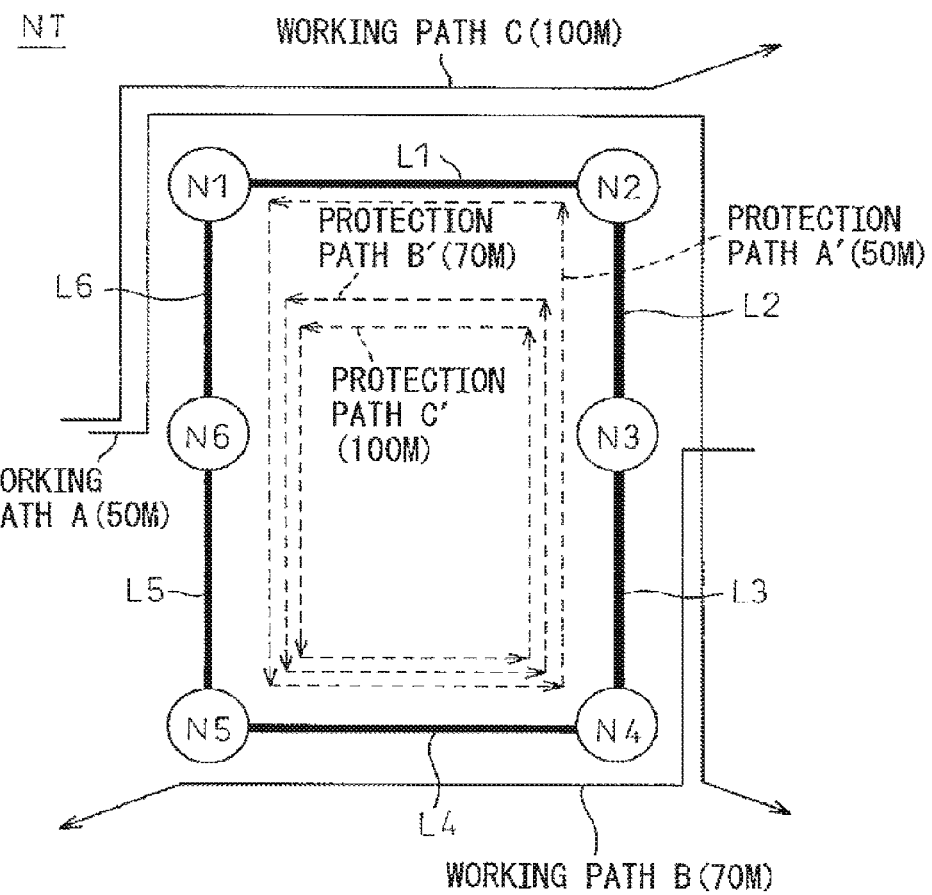
FIG. 2 is an explanatory diagram (part 2) illustrating one example of the prior art protection path setup method.
Figure 3:
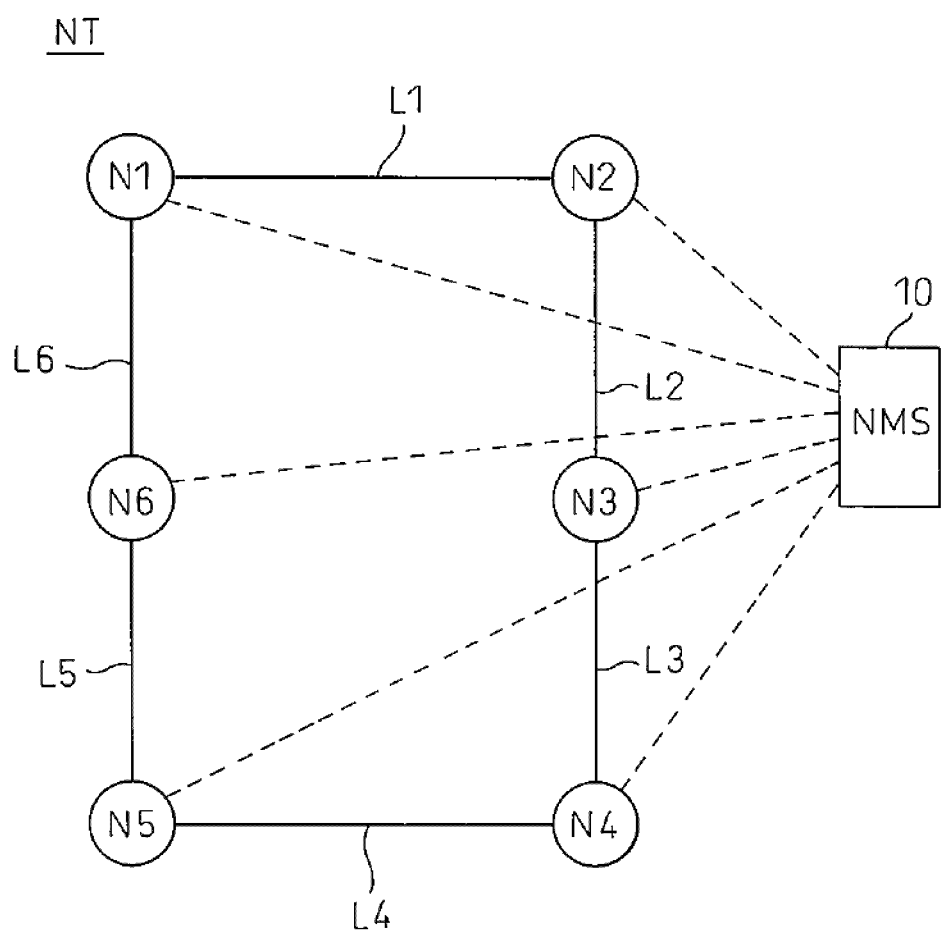
FIG. 3 is a diagram illustrating one configuration example of a ring network discussed herein.

Embodiments will be described below with reference to the accompanying drawings. FIG. 3 is a diagram illustrating one configuration example of a ring network discussed herein. The ring network NT includes a plurality of node apparatuses N1 to N6, links L1 to L6 connecting between the respective adjacent node apparatuses, and a network management system (NMS) 10 which sets up paths passing through the ring network NT. The links L1 to L6 form the ring network NT by connecting between the adjacent node apparatuses N1 and N2, N2 and N3, N3 and N4, N4 and N5, N5 and N6, and N6 and N1, respectively, thereby connecting the node apparatuses N1 to N6 in a ring configuration.

To provide protection by wrapping control for a working path passing through the ring network NT, the ring network NT provides a protection path that has the same bandwidth as the working path and that cycles around the ring network NT in a direction opposite to the signal transporting direction of the working path. The ring network NT according to the present embodiment reserves bandwidth resources for a shared path to be shared as a protection path among a plurality of working paths, rather than reserving protection path bandwidth resources independently for each working path.

Figure 4:
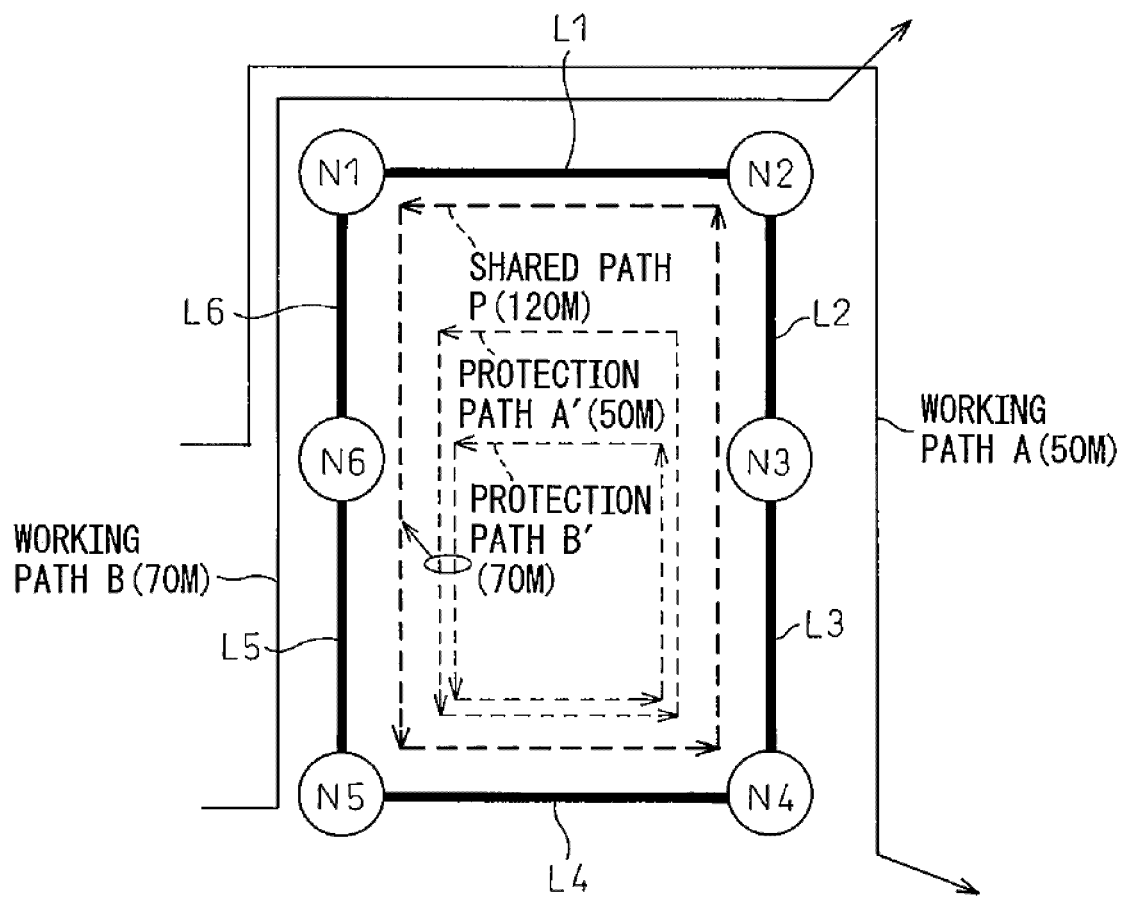
FIG. 4 is an explanatory diagram of a shared path.

FIG. 4 is an explanatory diagram of the shared path. In the illustrated ring network NT, working paths A and B having bandwidths of 50 Mbps and 70 Mbps, respectively, are set up. The working path A is set up from the startpoint node apparatus N6 to the endpoint node N4 by passing through the node apparatuses N6, N1, N2, N3, and N4 in this order. The working path B is set up from the startpoint node apparatus N5 to the endpoint node N2 by passing through the node apparatuses N5, N6, N1, and N2 in this order. The ring network NT reserves bandwidth resources for the shares path P as the bandwidth resources to be shared by the protection paths A' and B' having bandwidths of 50 Mbps and 70 Mbps in corresponding relationship to the respective working paths A and B.

The bandwidth resources reserved for the shared path P are given as the largest value among the per-link total values of the bandwidths that the working paths A and B use on the respective links L1 to L6 connecting between the respective node apparatuses N1 to N6. In the following description, the largest value among the per-link total values may sometimes be called the "maximum total bandwidth value." In the case of the working paths A and B illustrated in FIG. 4, the maximum total bandwidth value is 120 Mbps which is used on the links L6 and L1 where the working paths A and B overlap. Therefore, bandwidth resources equivalent to 120 Mbps are reserved for the shared path P. This maximum total bandwidth value represents the minimum necessary bandwidth to achieve a protection path having the same bandwidth as the working paths A and B.

Figure 5:
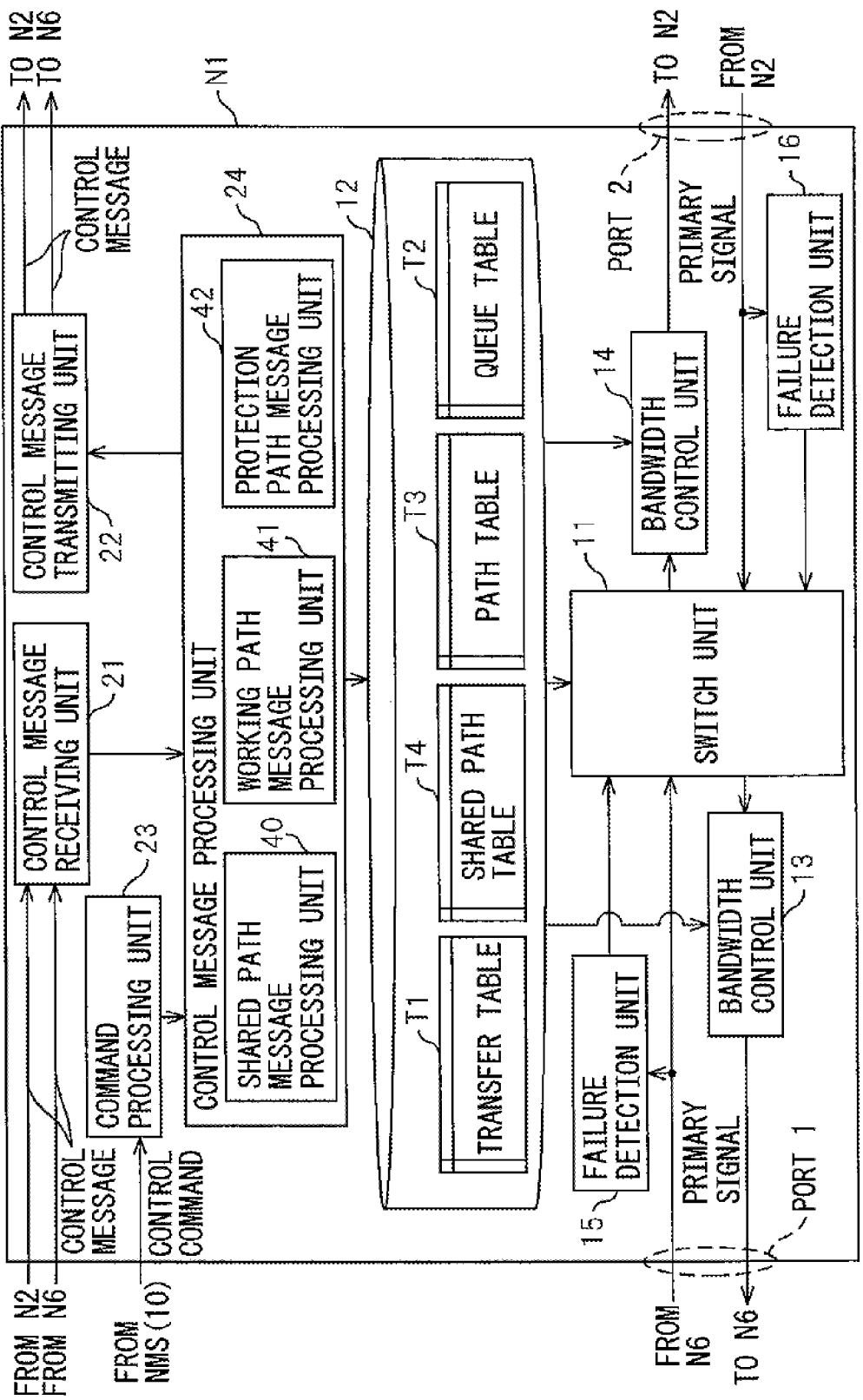
FIG. 5 is a diagram illustrating one configuration example of a node apparatus depicted in FIG. 3.

FIG. 5 is a diagram illustrating one configuration example of the node apparatus N1 depicted in FIG. 3. The configuration is the same for the other node apparatuses N2 to N6. Reference character 11 indicates a switch unit, reference character 12 indicates a storage unit, reference characters 13 and 14 indicate bandwidth control units, and reference characters 15 and 16 indicate failure detection units.

Reference character 21 indicates a control message receiving unit, reference character 22 indicates a control message transmitting unit, reference character 23 indicates a command processing unit, and reference character 24 indicates a control message processing unit. Reference character 40 indicates a shared path message processing unit, reference character 41 indicates a working path message processing unit, and reference character 42 indicates a protection path message processing unit.

Reference character T1 indicates a transfer table, reference character T2 indicates a queue table, reference character T3 indicates a path table, and reference character T4 indicates a shared path table.

The node apparatus N1 includes the switch unit 11, storage unit 12, bandwidth control units 13 and 14, failure detection units 15 and 16, control message receiving unit 21, control message transmitting unit 22, command processing unit 23, and control message processing unit 24.

The switch unit 11 performs processing to transfer a traffic signal, received at one of a plurality of ports connected to the links to the adjacent node apparatuses, to a designated one of the other ports. Of the plurality of ports, only the port 1 connected to the adjacent node apparatus N6 and the port 2 connected to the adjacent node apparatus N2 are depicted in FIG. 5, but the node apparatus N1 may further include other ports.

Based on the contents of the transfer table T1 stored in the storage unit 12, the switch unit 11 determines to which port the received traffic signal is to be transferred. FIG. 6 is a diagram illustrating one example of the data structure of the transfer table T1 depicted in FIG. 5. The transfer table T1 has a path ID field, an input port field, an output port field, an alternate port field, and a corresponding path ID field, and a record containing these fields is stored for each path passing through the node apparatus 1.

The path ID field carries the identifier of each designated path, and the input port field carries the identifier of the port at which the traffic signal on the designated path is input. The output port field carries the identifier of the port at which the traffic signal on the designated path is to be output.

The alternate port field carries the output port to which the traffic signal on the designated path is to be looped back for output when a failure is detected on the output side of the traffic signal. When the designated path is a working path, the corresponding path ID field carries the identifier of the protection path provided to back up that working path. When the designated path is a protection path, the corresponding path ID field carries the identifier of the working path backed up by that protection path.

The data contents of the transfer table T1 depicted in FIG. 6 correspond to the data contents for the case where the working paths A and B, the protection paths A' and B', and the shared path P have been set up as described with reference to FIG. 4. For the working path A, the port 1 connected to the adjacent node apparatus N6 is designated as the input port, and the port 2 connected to the adjacent node apparatus N2 is designated as the output port. When a failure is detected on the downstream side of the output port 2, the node apparatus N1 recovers from this failure through wrapping control by looping the traffic signal on the working path A back to the port 1. For this reason, the alternate port field carries the identifier of the port 1. The corresponding path ID field carries the identifier of the protection path A'.

Likewise, for the protection path A', the port 2 is designated as the input port, and the port 1 as the output port. When a failure is detected on the downstream side of the output port 1, the node apparatus N1 loops the traffic signal on the protection path A' back to the port 2; accordingly, the alternate port field carries the identifier of the port 2. The corresponding path ID field carries the identifier of the working path A.

For the working path B, the port 1 is designated as the input port, and the port 2 as the output port. When a failure is detected on the downstream side of the output port 2, the node apparatus N1 loops the traffic signal on the working path B back to the port 1; accordingly, the alternate port field carries the identifier of the port 1. The corresponding path ID field carries the identifier of the protection path B'. For the protection path B', the port 2 is designated as the input port, and the port 1 as the output port. When a failure is detected on the downstream side of the output port 1, the node apparatus N1 loops the traffic signal on the protection path B' back to the port 2; accordingly, the alternate port field carries the identifier of the port 2. The corresponding path ID field carries the identifier of the working path B.

For the shared path P, which is a path used as the bandwidth resources for the protection paths A' and B', the port 2 is designated as the input port, and the port 1 as the output port. For the shared path P, data entries to the alternate port field and the corresponding path ID field may be omitted.

The switch unit 11 in FIG. 5 refers to the path identifier contained in the header information of the received traffic signal. The switch unit 11 identifies the output port specified in the transfer table T1 for that path identifier. If no failure is detected at the identified output port by the failure detection unit 15 or 16 to be described later, the switch unit 11 transfers the traffic signal to that identified output port. If a failure is detected at the identified output port, the switch unit 11 transfers the traffic signal to the alternate port specified in the transfer table T1.

The bandwidth control units 13 and 14 in FIG. 5 control the bandwidth of the traffic signal on each path in accordance with the contents of the queue table T2 and path table T3 stored in the storage unit 12. FIG. 7 is a diagram illustrating one example of the data structure of the queue table T2 depicted in FIG. 5. The queue table T2 has a queue field and an allowable bandwidth field, and a record containing these fields is stored for each queue used for bandwidth control by the bandwidth control units 13 and 14. The queue field carries the identifier of each designated queue. The allowable bandwidth field carries the bandwidth allowable for the traffic that is output from each designated queue.

The data contents of the queue table T2 depicted in FIG. 7 correspond to the case where the paths have been set up as described with reference to FIG. 4. Queue 1 is used for the bandwidth control of the traffic on the protection paths that use the bandwidth resources of the shared path P, and 120 Mbps is reserved as the allowable bandwidth. Queue 2 is used for the bandwidth control of the traffic on the working path A, and 50 Mbps is reserved as the allowable bandwidth. Queue 3 is used for the bandwidth control of the traffic on the working path B, and 70 Mbps is reserved as the allowable bandwidth.

Figures 8, 9, 10:
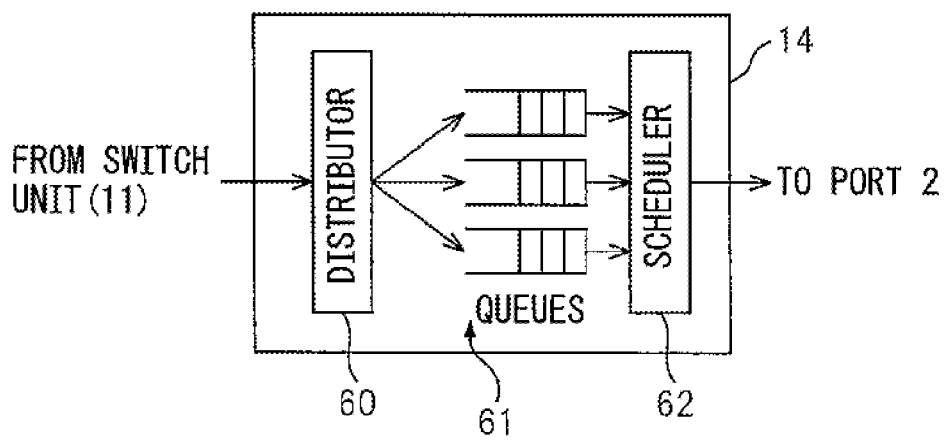
FIG. 8 is a diagram illustrating one example of the data structure of a path table depicted in FIG. 5.
FIG. 9 is a diagram illustrating one configuration example of a bandwidth control unit depicted in FIG. 5.
FIG. 10 is a diagram illustrating one example of the data structure of a shared path table depicted in FIG. 5.

FIG. 8 is a diagram illustrating one example of the data structure of the path table T3 depicted in FIG. 5. The path table T3 has a path ID field and an associated queue field, and a record containing these fields is stored for each of the currently set working paths and protection paths. The path ID field carries the identifier of each designated path. The associated queue field carries the identifier of the queue to be used by the bandwidth control units 13 and 14 for the bandwidth control of the designated queue.

The data contents of the path table T3 depicted in FIG. 8 correspond to the case where the paths have been set up as described with reference to FIG. 4. The queues to be used for the bandwidth control of the working paths A and B are the queues 2 and 3, respectively. The queue to be used for the bandwidth control of the protection paths A' and B' that use the bandwidth resources of the same shared path P is the queue 1.

FIG. 9 is a diagram illustrating one configuration example of the bandwidth control unit 14 depicted in FIG. 5. The configuration is the same for the bandwidth control unit 13. Reference character 60 indicates a distributor, reference character 61 indicates a plurality of queues, and reference character 62 indicates a scheduler. The bandwidth control unit 14 includes the distributor 60, the plurality of queues 61, and the scheduler 62.

The distributor 60 refers to the path identifier contained in the header information of the traffic signal received from the switch unit 11, and distributes the traffic signal to the queue specified for that path identifier in the path table T3 from among the plurality of queues 61. The scheduler 62 controls the amount of traffic to be output from each queue in accordance with the allowable bandwidth specified for a corresponding one of the plurality of queues 61 in the queue table T2.

The failure detection units 15 and 16 detect a failure occurring on the links connected to the respective ports 1 and 2, and notify the switch unit 11. For example, when the signal arriving via the port 1 or 2 has ceased for a predefined period of time, the failure detection unit 15 or 16 determines that a failure has occurred on the link connected to that port.

The control message receiving unit 21 performs processing to receive a prescribed control message from a node apparatus adjacent to the node apparatus N1. The kinds of the control message include working path setup message, working path change message, and working path delete message which respectively request the setup, changing, and deletion of a working path from a certain node apparatus to another node apparatus.

The kinds of the control message also include shared path setup message, shared path change message, and shared path delete message which respectively request the setup, changing, and deletion of a shared path from a certain node apparatus to another node apparatus. The kinds of the control message further include protection path setup message, protection path change message, and protection path delete message which respectively request the setup, changing, and deletion of a protection path from a certain node apparatus to another node apparatus. The control message transmitting unit 22 performs processing to transmit the control message to the adjacent node apparatus.

When the control message receiving unit 21 receives the control message of any one of the above enumerated kinds, the control message processing unit 24 changes the setting for the node apparatus N1 by updating the contents of a corresponding one or ones of the tables T1 to T4 in the storage unit 12 in accordance with the received control message. The kind of the control message is not limited to any one of the above enumerated kinds, and a control message of a kind other than the above enumerated kinds may be received; in that case also, the control message processing unit 24 changes the setting for the node apparatus N1 in accordance with the contents of the received message. The control message processing unit 24 includes the shared path message processing unit 40, working path message processing unit 41, and protection path message processing unit 42.

When the received control message is a shared path setup message, the shared path message processing unit 40 creates, in the shared path table T4 stored in the storage unit 12, an entry for the identifier of the new shared path specified in the shared path setup message. FIG. 10 is a diagram illustrating one example of the data structure of the shared path table T4 depicted in FIG. 5. The shared path table T4 has a path ID field and an associated queue field, and a record containing these fields is stored for each shared path provided in the node apparatus N1.

The path ID field carries the identifier of each designated shared path. The associated queue field carries the identifier of the queue that is used, from among the plurality of queues 61 in the bandwidth control unit 13 or 14, to control the traffic on the protection path that uses the bandwidth resources of the designated shared path. The data contents of the shared path table T4 depicted in FIG. 10 correspond to the case where the paths have been set up as described with reference to FIG. 4. In the example illustrated in FIG. 4, the shared path P is set up, and the queue 1 is the queue used to control the traffic on the protection path that uses the bandwidth resources of the shared path P.

In response to the reception of the shared path setup message, the shared path message processing unit 40 generates a queue to be used for the new shared path, and creates an entry for this queue in the queue table T2. The value of bandwidth information specified in the shared path setup command is stored in the allowable bandwidth field of the thus created entry. Further, the shared path message processing unit 40 creates an entry for the new shared path in the shared path table T4, and stores in the associated queue field the identifier of the queue for which the entry has been created in the queue table T2.

Based on the routing information contained in the shared path setup message, the shared path message processing unit 40 determines the input port and output port via which the traffic on the protection path that uses the bandwidth resources of the new shared path is input and output. The shared path message processing unit 40 creates an entry for the new shared path in the transfer table T1, and stores the identifiers of the thus determined input port and output port in its input port field and output port field, respectively.

When the received control message is a shared path change message, the shared path message processing unit 40 refers to the identifier of the shared path specified in the shared path change message, and identifies the queue specified in the shared path table T4 for that shared path. The shared path message processing unit 40 changes the value of the allowable bandwidth, specified in the queue table T2 for that queue, to the value specified in the shared path change message.

When the received control message is a shared path delete message, the shared path message processing unit 40 refers to the identifier of the shared path specified in the shared path delete message, and deletes the entries for that shared path from the shared path table T4 and transfer table T1. It also deletes from the queue table T2 the entry for the queue specified in the shared path table T4 for that shared path.

The control message includes routing information which specifies the node apparatuses located along the transmission path of the message and the ports for receiving and transmitting the message at each node apparatus. When the node apparatus that received the shared path setup message, shared path change message, or shared path delete message is not the endpoint of that message, the shared path message processing unit 40 instructs the control message transmitting unit 22 to transfer the message to the next node apparatus.

When the received control message is a working path setup message, the working path message processing unit 41 generates a queue to be used for the new working path, and creates an entry for this queue in the queue table T2. The value of bandwidth information specified in the working path setup command is stored in the allowable bandwidth field of the thus created entry.

Further, the working path message processing unit 41 creates in the path table T3 an entry for the identifier of the new working path specified in the working path setup message, and stores in the associated queue field the identifier of the queue for which the new entry has been created in the queue table T2. Based on the routing information contained in the working path setup message, the working path message processing unit 41 determines the input port and output port via which the traffic on the new working path is input and output. The working path message processing unit 41 creates an entry for the new working path in the transfer table T1, and stores the identifiers of the thus determined input port and output port in its input port field and output port field, respectively.

When the received control message is a working path change message, the working path message processing unit 41 refers to the identifier of the working path specified in the working path change message, and identifies the queue specified in the path table T3 for that working path. The working path message processing unit 41 changes the value of the allowable bandwidth, specified in the queue table T2 for that queue, to the value specified in the working path change message.

When the received control message is a working path delete message, the working path message processing unit 41 refers to the identifier of the working path specified in the working path delete message, and deletes the entries for that working path from the path table T3 and transfer table T1. It also deletes from the queue table T2 the entry for the queue specified in the path table T3 for that working path.

When the node apparatus that received the working path setup message, working path change message, or working path delete message is not the endpoint of that message, the working path message processing unit 41 instructs the control message transmitting unit 22 to transfer the message to the next node apparatus.

When the received control message is a protection path setup message, the protection path message processing unit 42 creates in the path table T3 an entry for the identifier of the new protection path specified in the protection path setup message. The protection path message processing unit 42 refers to the identifier of the shared path specified in the protection path setup message as being the path whose bandwidth resources are to be used by the new protection path, and identifies the queue specified in the shared path table T4 for that shared path. The protection path message processing unit 42 stores the identifier of the thus identified queue in the associated queue field of the entry newly created in the path table T3.

Based on the routing information contained in the protection path setup message, the protection path message processing unit 42 determines the input port and output port via which the traffic on the new protection path is input and output. The protection path message processing unit 42 creates an entry for the new protection path in the transfer table T1, and stores the identifiers of the thus determined input port and output port in its input port field and output port field, respectively.

The protection path message processing unit 42 stores, in the corresponding path ID field of the entry created in the transfer table T1 for the new protection path, the identifier of the working path specified in the protection path setup message as being the path to be backed up by that new protection path. Further, the protection path message processing unit 42 identifies the output port specified in the transfer table T1 for the above working path specified in the protection path setup message, and stores it in the alternate port field of the entry created for the new protection path.

Further, the protection path message processing unit 42 stores the output port of the new protection path and the identifier of the new protection path, respectively, in the alternate port field and corresponding ID field of the entry provided in the transfer table T1 for the above working path specified in the protection path setup message.

When the received control message is a protection path change message, the protection path message processing unit 42 identifies the queue specified in the shared path table T4 for the shared path specified in the protection path change message. The protection path message processing unit 42 enters the identifier of the thus identified queue to update the value stored in the associated queue field of the entry provided in the path table T3 for the protection path specified in the protection path change message.

When the received control message is a protection path delete message, the protection path message processing unit 42 refers to the identifier of the protection path specified in the protection path delete message, and deletes the entries for that protection path from the path table T3 and transfer table T1.

When the node apparatus that received the protection path setup message, protection path change message, or protection path delete message is not the endpoint of that message, the protection path message processing unit 42 instructs the control message transmitting unit 22 to transfer the message to the next node apparatus.

The command processing unit 23 in FIG. 5 receives a prescribed control command from the NMS 10, and passes the received command to the shared path message processing unit 40, the working path message processing unit 41, or the protection path message processing unit 42, whichever is appropriate, according to the kind of the command. The kinds of the control command include working path setup command, working path change command, and working path delete command which respectively request the setup, changing, and deletion of a working path.

The kinds of the control command also include shared path setup command, shared path change command, and shared path delete command which respectively request the setup, changing, and deletion of a shared path. The kinds of the control command further include protection path setup command, protection path change command, and protection path delete command which respectively request the setup, changing, and deletion of a protection path. The kind of the control command is not limited to any one of the above enumerated kinds, and a control command of a kind other than the above enumerated kinds may be received; in that case also, the command processing unit 23 changes the setting for the node apparatus N1 in accordance with the contents of the received command.

When any one of the shared path setup command, shared path change command, and shared path delete command is received, the command processing unit 23 passes the command to the shared path message processing unit 40. When any one of the shared path setup command, shared path change command, and shared path delete command is received, the shared path message processing unit 40 performs the same processing as when the shared path setup message, shared path change message, or shared path delete message, respectively, is received.

For the control command to be transmitted to all the nodes related to the path to be set up, changed, or deleted, the control command includes routing information which specifies the node apparatuses located along the transmission path of the command and the ports for receiving and transmitting the message at each node apparatus. The shared path message processing unit 40 creates the shared path setup message, shared path change message, or shared path delete message for requesting the same control operation as that specified by the shared path setup command, shared path change command, or shared path delete command, respectively. Here, the shared path message processing unit 40 creates the shared path setup message, shared path change message, or shared path delete message by also including routing information for the path that passes through the route specified by the routing information contained in the corresponding control command. The shared path message processing unit 40 instructs the control message transmitting unit 22 to transfer the control message to the node apparatus specified as the next node by the routing information.

When any one of the working path setup command, working path change command, and working path delete command is received, the command processing unit 23 passes the command to the working path message processing unit 41. When any one of the working path setup command, working path change command, and working path delete command is received, the working path message processing unit 41 performs the same processing as when the working path setup message, working path change message, or working path delete message, respectively, is received.

The working path message processing unit 41 creates the working path setup message, working path change message, or working path delete message for requesting the same control operation as that specified by the working path setup command, working path change command, or working path delete command, respectively. Here, the working path message processing unit 41 creates the working path setup message, working path change message, or working path delete message by also including routing information for the path that passes through the route specified by the routing information contained in the corresponding control command. The working path message processing unit 41 instructs the control message transmitting unit 22 to transfer the control message to the node apparatus specified as the next node by the routing information.

When any one of the protection path setup command, protection path change command, and protection path delete command is received, the command processing unit 23 passes the command to the protection path message processing unit 42. When any one of the protection path setup command, protection path change command, the protection path delete command is received, the protection path message processing unit 42 performs the same processing as when the protection path setup message, protection path change message, or protection path delete message, respectively, is received.

The protection path message processing unit 42 creates the protection path setup message, protection path change message, or protection path delete message for requesting the same control operation as that specified by the protection path setup command, protection path change command, or protection path delete command, respectively. The protection path message processing unit 42 creates the protection path setup message, protection path change message, or protection path delete message by also including routing information for the path that passes through the route specified by the routing information contained in the corresponding control command. The protection path message processing unit 42 instructs the control message transmitting unit 22 to transfer the control message to the node apparatus specified as the next node by the routing information.

Figure 11:
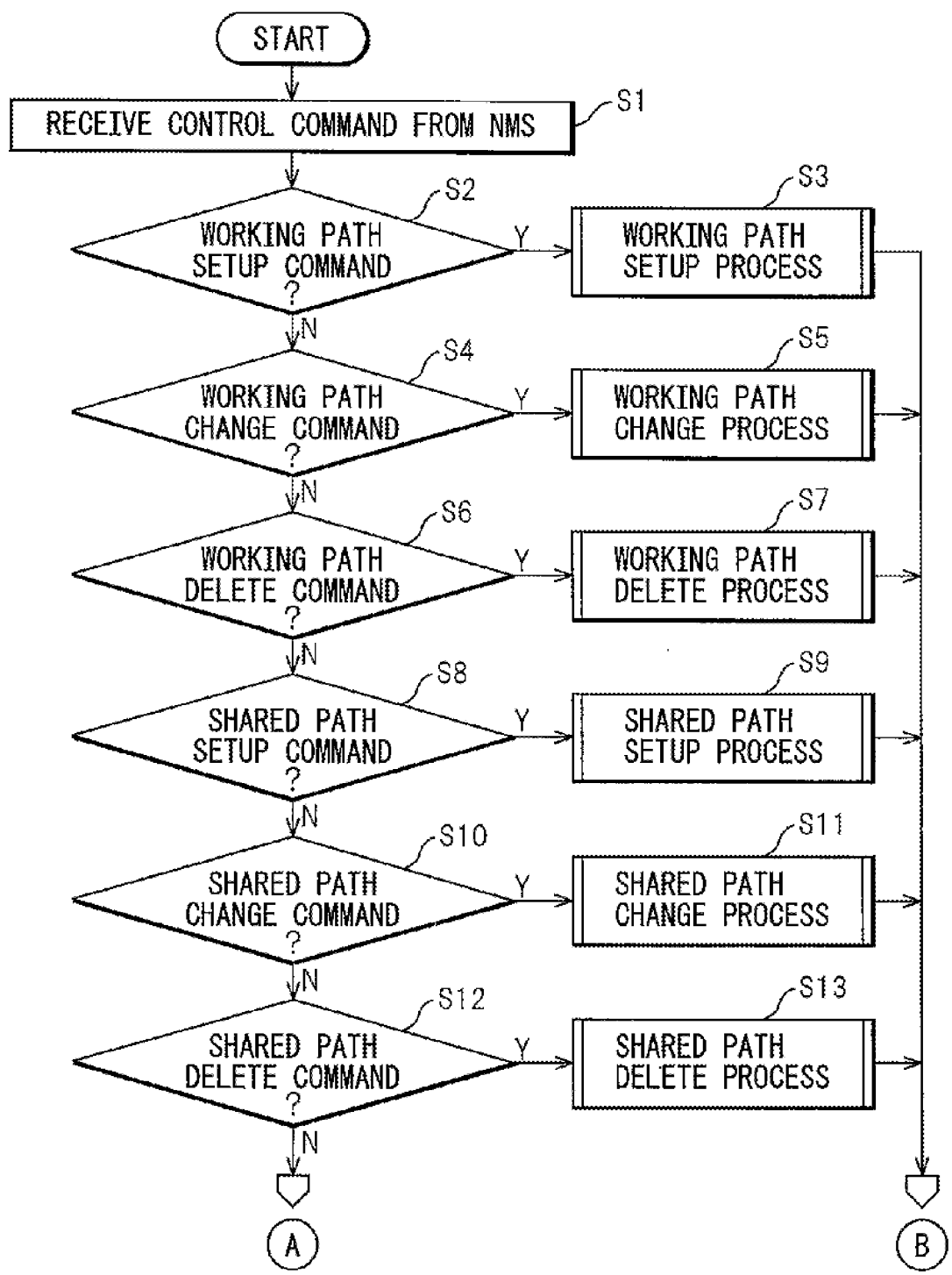
FIG. 11 is a flowchart (part 1) illustrating one example of the processing performed when a control command is received from an NMS.

The operation of the node apparatus N1 will be described below. FIGS. 11 and 12 are flowcharts illustrating one example of the processing that the node apparatus N1 performs in response to the reception of a control command from the NMS 10. In step S1, the command processing unit 23 receives the control command from the NMS 10. In step S2, the command processing unit 23 determines whether the received command is a working path setup command or not. If the received command is not a working path setup command (N in step S2), the command processing unit 23 proceeds to step S4.

If the received command is a working path setup command (Y in step S2), the command processing unit 23 passes the working path setup command to the working path message processing unit 41, and the process proceeds to step S3. FIG. 13 is a diagram illustrating one example of the data structure of the instruction information contained in the working path setup command. The data structure of the instruction information contained in the working path setup command includes fields for storing "kind code," "path ID," "routing information," "bandwidth information," and "protection path ID."

The kind code is a code that indicates to which of a plurality of kinds, including the earlier enumerated kinds, the control command belongs. The path ID indicates the identifier of the new working path to be set up. The routing information specifies the route through which the new working path passes. For example, the routing information may be information that specifies a set of identifiers identifying the node apparatuses located along the route of the designated path, the identifiers being arranged in the order in which the path passes through the respective nodes, and the ports that are used at each node apparatus to receive and transmit out the traffic signal flowing on the path. The bandwidth information specifies the allowable bandwidth requested of the new working path. The protection path ID indicates the identifier of the protection path used to back up the new working path.

In step S3, the working path message processing unit 41 generates a queue to be used for the new working path, and creates an entry for this queue in the queue table T2. The value of bandwidth information specified in the working path setup command is stored in the allowable bandwidth field of the thus created entry. The working path message processing unit 41 creates in the path table T3 an entry for the identifier of the working path specified by the working path setup command, and stores in the associated queue field the identifier of the queue for which the new entry has been created in the queue table T2.

Based on the routing information contained in the working path setup command, the working path message processing unit 41 determines the input port and output port via which the traffic on the new working path is input to and output from the node apparatus N1. The working path message processing unit 41 creates an entry for the new working path in the transfer table T1, and stores the identifiers of the thus determined input port and output port in its input port field and output port field, respectively. After that, the working path message processing unit 41 proceeds to step S21.

In step S21, the working path message processing unit 41 creates a working path setup message by including therein the path ID, bandwidth information, and protection path ID contained in the working path setup command. The working path message processing unit 41 creates the working path setup message by also including routing information for the new working path based on the routing information contained in the working path setup command. The working path message processing unit 41 instructs the control message transmitting unit 22 to transfer the working path setup message to the adjacent node apparatus specified as the next node, i.e., the downstream node by the routing information, and thereafter causes the process to terminate.

In step S4, the command processing unit 23 determines whether the received command is a working path change command or not. If the received command is not a working path change command (N in step S4), the command processing unit 23 proceeds to step S6.

If the received command is a working path change command (Y in step S4), the command processing unit 23 passes the working path change command to the working path message processing unit 41, and the process proceeds to step S5. FIG. 14 is a diagram illustrating one example of the data structure of the instruction information contained in the working path change command. The data structure of the instruction information contained in the working path change command includes fields for storing "kind code," "path ID," "routing information," and "bandwidth information."

The path ID indicates the identifier of the working path to be changed. The routing information specifies the route through which the working path to be changed passes. The bandwidth information specifies the allowable bandwidth requested of the working path to be changed.

In step S5, the working path message processing unit 41 refers to the identifier of the working path specified by the working path change command, and identifies the queue specified in the path table T3 for that working path. The working path message processing unit 41 changes the value of the allowable bandwidth, specified in the queue table T2 for that queue, to the value specified by the bandwidth information contained in the working path change command. After that, the working path message processing unit 41 proceeds to step S21.

In step S21, the working path message processing unit 41 creates a working path change message by including therein the path ID and bandwidth information contained in the working path change command. The working path message processing unit 41 creates the working path change message by also including routing information for the working path to be changed, based on the routing information contained in the working path change command. The working path message processing unit 41 instructs the control message transmitting unit 22 to transfer the working path change message to the adjacent node apparatus specified as the downstream node by the routing information, and thereafter causes the process to terminate.

In step S6, the command processing unit 23 determines whether the received command is a working path delete command or not. If the received command is not a working path delete command (N in step S6), the command processing unit 23 proceeds to step S8.

If the received command is a working path delete command (Y in step S6), the command processing unit 23 passes the working path delete command to the working path message processing unit 41, and the process proceeds to step S7. The data structure of the instruction information contained in the working path delete command may be the same as that depicted in FIG. 14. The path ID indicates the identifier of the working path to be deleted. The routing information specifies the route through which the working path to be deleted passes.

In step S7, the working path message processing unit 41 refers to the identifier of the working path specified by the working path delete command, and deletes the entries for that working path from the path table T3 and transfer table T1. It also deletes from the queue table T2 the entry for the queue specified in the path table T3 for that working path. After that, the working path message processing unit 41 proceeds to step S21.

In step S21, the working path message processing unit 41 creates a working path delete message by including therein the path ID contained in the working path delete command. The working path message processing unit 41 creates the working path delete message by also including routing information for the working path to be deleted, based on the routing information contained in the working path delete command. The working path message processing unit 41 instructs the control message transmitting unit 22 to transfer the working path delete message to the adjacent node apparatus specified as the downstream node by the routing information, and thereafter causes the process to terminate.

In step S8, the command processing unit 23 determines whether the received command is a shared path setup command or not. If the received command is not a shared path setup command (N in step S8), the command processing unit 23 proceeds to step S10.

If the received command is a shared path setup command (Y in step S8), the command processing unit 23 passes the shared path setup command to the shared path message processing unit 40, and the process proceeds to step S9. The data structure of the instruction information contained in the shared path setup command may be the same as that depicted in FIG. 14. The path ID indicates the identifier of the new shared path to be set up. The routing information specifies the route through which the new shared path passes. The bandwidth information specifies the allowable bandwidth requested of the new shared path.

When creating the shared path setup command to be transmitted to the node apparatus N1, the NMS 10 specifies the largest value among the per-link total values of the bandwidths that the existing working paths use on the respective links L1 to L6, that is, the maximum total bandwidth value, as the bandwidth information.

In step S9, the shared path message processing unit 40 generates a queue to be used for the bandwidth control of the protection path that uses the bandwidth resources of the new shared path, and creates an entry for this queue in the queue table T2. The value of bandwidth information specified in the shared path setup command is stored in the allowable bandwidth field of the thus created entry. The shared path message processing unit 40 creates an entry for the new shared path in the shared path table T4, and stores in the associated queue field the identifier of the queue for which the new entry has been created in the queue table T2.

Based on the routing information contained in the shared path setup command, the shared path message processing unit 40 determines the input port and output port via which the traffic on the protection path that uses the bandwidth resources of the new shared path is input to and output from the node apparatus N1. The shared path message processing unit 40 creates an entry for the new shared path in the transfer table T1, and stores the identifiers of the thus determined input port and output port in its input port field and output port field, respectively. After that, the shared path message processing unit 40 proceeds to step S21.

In step S21, the shared path message processing unit 40 creates a shared path setup message by including therein the path ID and bandwidth information contained in the shared path setup command. The shared path message processing unit 40 creates the shared path setup message by also including routing information for the new shared path based on the routing information contained in the shared path setup command. The shared path message processing unit 40 instructs the control message transmitting unit 22 to transfer the shared path setup message to the adjacent node apparatus specified as the downstream node by the routing information, and thereafter causes the process to terminate.

In step S10, the command processing unit 23 determines whether the received command is a shared path change command or not. If the received command is not a shared path change command (N in step S10), the command processing unit 23 proceeds to step S12.

If the received command is a shared path change command (Y in step S10), the command processing unit 23 passes the shared path change command to the shared path message processing unit 40, and the process proceeds to step S11. The data structure of the instruction information contained in the shared path change command may be the same as that depicted in FIG. 14. The path ID indicates the identifier of the shared path to be changed. The routing information specifies the route through which the shared path to be changed passes. The bandwidth information specifies the new allowable bandwidth requested of the shared path to be changed.

When creating the shared path change command to be transmitted to the node apparatus N1, the NMS 10 specifies the largest value among the per-link total values of the bandwidths that the existing working paths use on the respective links L1 to L6, i.e., the maximum total bandwidth value, as the bandwidth information.

In step S11, the shared path message processing unit 40 refers to the identifier of the shared path specified by the shared path change command as being the path to be changed, and identifies the queue specified in the shared path table T4 for that shared path. The shared path message processing unit 40 changes the value of the allowable bandwidth, specified in the queue table T2 for that queue, to the value specified as the bandwidth information by the shared path change command. After that, the shared path message processing unit 40 proceeds to step S21.

In step S21, the shared path message processing unit 40 creates a shared path change message by including therein the path ID and bandwidth information contained in the shared path change command. The shared path message processing unit 40 creates the shared path change message by also including routing information for the shared path to be changed, based on the routing information contained in the shared path change command. The shared path message processing unit 40 instructs the control message transmitting unit 22 to transfer the shared path change message to the adjacent node apparatus specified as the downstream node by the routing information, and thereafter causes the process to terminate.

In step S12, the command processing unit 23 determines whether the received command is a shared path delete command or not. If the received command is not a shared path delete command (N in step S12), the command processing unit 23 proceeds to step S14.

If the received command is a shared path delete command (Y in step S12), the command processing unit 23 passes the shared path delete command to the shared path message processing unit 40, and the process proceeds to step S13. The data structure of the instruction information contained in the shared path delete command may be the same as that depicted in FIG. 14. The path ID indicates the identifier of the shared path to be deleted. The routing information specifies the route through which the shared path to be deleted passes.

In step S13, the shared path message processing unit 40 refers to the identifier of the shared path specified by the shared path delete command, and deletes the entries for that shared path from the shared path table T4 and transfer table T1. It also deletes from the queue table T2 the entry for the queue specified in the shared path table T4 for that shared path. After that, the shared path message processing unit 40 proceeds to step S21.

In step S21, the shared path message processing unit 40 creates a shared path delete message by including therein the path ID contained in the shared path delete command. The shared path message processing unit 40 creates the shared path delete message by also including routing information for the shared path to be deleted, based on the routing information contained in the shared path delete command. The shared path message processing unit 40 instructs the control message transmitting unit 22 to transfer the shared path delete message to the adjacent node apparatus specified as the downstream node by the routing information, and thereafter causes the process to terminate.

In step S14, the command processing unit 23 determines whether the received command is a protection path setup command or not. If the received command is not a protection path setup command (N in step S14), the command processing unit 23 proceeds to step S16.

If the received command is a protection path setup command (Y in step S14), the command processing unit 23 passes the protection path setup command to the protection path message processing unit 42, and the process proceeds to step S15. FIG. 15 is a diagram illustrating one example of the data structure of the instruction information contained in the protection path setup command. The data structure of the instruction information contained in the protection path setup command includes fields for storing "kind code," "path ID," "routing information," "bandwidth information," "working path ID," and "shared path ID."

The path ID indicates the identifier of the new protection path to be set up. The routing information specifies the route through which the new protection path passes. The working path ID indicates the identifier of the working path to be backed up by the new protection path. The shared path ID indicates the identifier of the shared path whose bandwidth resources are to be used by the new protection path.

When creating protection path setup commands respectively to set up a plurality of protection paths that use the same bandwidth resources, the NMS 10 specifies the identifier of the same shared path as the shared path ID in the protection path setup commands.

In step S15, the protection path message processing unit 42 creates in the path table T3 an entry for the identifier of the new protection path specified by the protection path setup command. The protection path message processing unit 42 refers to the identifier of the shared path specified in the protection path setup command as being the path whose bandwidth resources are to be used by the new protection path, and identifies the queue specified in the shared path table T4 for that shared path. The protection path message processing unit 42 stores the identifier of the thus identified queue in the associated queue field of the entry newly created in the path table T3.

Based on the routing information contained in the protection path setup command, the protection path message processing unit 42 determines the input port and output port via which the traffic on the new protection path is input and output. The protection path message processing unit 42 creates an entry for the new protection path in the transfer table T1, and stores the identifiers of the thus determined input port and output port in its input port field and output port field, respectively.

The protection path message processing unit 42 stores, in the corresponding path ID field of the entry created in the transfer table T1 for the new protection path, the identifier of the working path specified in the protection path setup command as being the path to be backed up by that new protection path. Further, the protection path message processing unit 42 identifies the output port specified in the transfer table T1 for the above working path specified in the protection path setup command, and stores it in the alternate port field of the entry created for the new protection path.

Further, the protection path message processing unit 42 stores the output port of the new protection path and the identifier of the new protection path, respectively, in the alternate port field and corresponding ID field of the entry provided in the transfer table T1 for the above working path specified in the protection path setup command. After that, the protection path message processing unit 42 proceeds to step S21.

In step S21, the protection path message processing unit 42 creates a protection path setup message by including therein the path ID, working path ID, and shared path ID contained in the protection path setup command. The protection path message processing unit 42 creates the protection path setup message by also including routing information for the new protection path based on the routing information contained in the protection path setup command. The protection path message processing unit 42 instructs the control message transmitting unit 22 to transfer the protection path setup message to the adjacent node apparatus specified as the downstream node by the routing information, and thereafter causes the process to terminate.

In step S16, the command processing unit 23 determines whether the received command is a protection path change command or not. If the received command is not a protection path change command (N in step S16), the command processing unit 23 proceeds to step S18.

If the received command is a protection path change command (Y in step S16), the command processing unit 23 passes the protection path change command to the protection path message processing unit 42, and the process proceeds to step S17. FIG. 16 is a diagram illustrating one example of the data structure of the instruction information contained in the protection path change command. The data structure of the instruction information contained in the protection path change command includes fields for storing "kind code," "path ID," "routing information," "bandwidth information," and "shared path ID."

The path ID indicates the identifier of the protection path to be changed. The routing information specifies the route through which the protection path to be changed passes. The shared path ID indicates the identifier of the shared path whose bandwidth resources are used by the protection path to be changed. When creating a protection path change command for causing a certain protection path to use the same bandwidth resources as those used by some other protection path, the NMS 10 specifies as the shared path ID in the protection path change command the identifier of the shared path whose bandwidth resources are used by that other protection path.

In step S17, the protection path message processing unit 42 identifies the queue specified in the shared path table T4 for the shared path specified in the protection path change command. The protection path message processing unit 42 enters the identifier of the thus identified queue to update the value stored in the associated queue field of the entry provided in the path table T3 for the protection path specified by the protection path change command. After that, the protection path message processing unit 42 proceeds to step S21.

In step S21, the protection path message processing unit 42 creates a protection path change message by including therein the path ID and shared path ID contained in the protection path change command. The protection path message processing unit 42 creates the protection path change message by also including routing information for the protection path to be changed, based on the routing information contained in the protection path change command. The protection path message processing unit 42 instructs the control message transmitting unit 22 to transfer the protection path change message to the adjacent node apparatus specified as the downstream node by the routing information, and thereafter causes the process to terminate.

In step S18, the command processing unit 23 determines whether the received command is a protection path delete command or not. If the received command is not a protection path delete command (N in step S18), the command processing unit 23 proceeds to step S20.

If the received command is a protection path delete command (Y in step S18), the command processing unit 23 passes the protection path delete command to the protection path message processing unit 42, and the process proceeds to step S19. The data structure of the instruction information contained in the protection path delete command may be the same as that depicted in FIG. 14. The path ID indicates the identifier of the protection path to be deleted. The routing information specifies the route through which the protection path to be deleted passes.

In step S17, the protection path message processing unit 42 refers to the identifier of the protection path specified by the protection path delete command, and deletes the entries for that protection path from the path table T3 and transfer table T1. After that, the protection path message processing unit 42 proceeds to step S21.

In step S21, the protection path message processing unit 42 creates a protection path delete message by including therein the path ID contained in the protection path delete command. The protection path message processing unit 42 creates the protection path delete message by also including routing information for the protection path to be deleted, based on the routing information contained in the protection path delete command. The protection path message processing unit 42 instructs the control message transmitting unit 22 to transfer the protection path delete message to the adjacent node apparatus specified as the downstream node by the routing information, and thereafter causes the process to terminate.

If the control command received in step S1 is a command that specifies a control operation other than the setup, changing, or deletion of a working, shared, or protection path, the process proceeds to S20. The command processing unit 23 processes the command accordingly, and thereafter causes the process to terminate.

Figure 17:
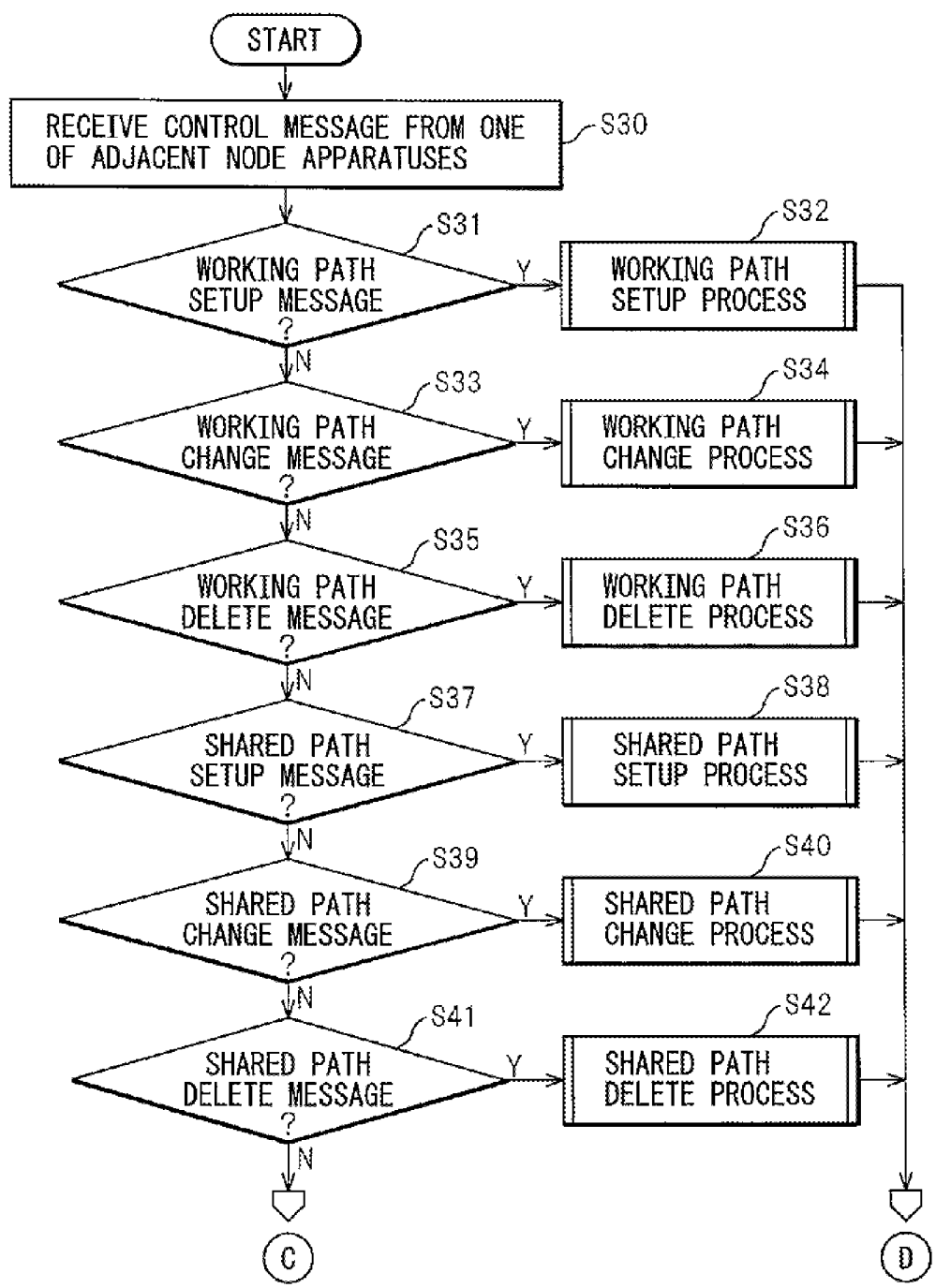
FIG. 17 is a flowchart (part 1) illustrating one example of the processing performed when a control message is received.

FIGS. 17 and 18 are flowcharts illustrating one example of the processing that the node apparatus N1 performs in response to the reception of a control message from a node apparatus adjacent to it. In step S30, the control message receiving unit 21 receives the control message from the adjacent node apparatus. In step S31, the control message receiving unit 21 determines whether the received control message is a working path setup message or not. If the received control message is not a working path setup message (N in step S31), the control message receiving unit 21 proceeds to step S33.

If the received message is a working path setup message (Y in step S31), the control message receiving unit 21 passes the working path setup message to the working path message processing unit 41, and proceeds to step S32. FIG. 19 is a diagram illustrating a first example of the data structure of the instruction information contained in the working path setup message. The data structure of the instruction information contained in the working path setup message includes fields for storing "kind code," "path ID," "routing information," "bandwidth information," and "protection path ID."

The kind code is a code that indicates to which of a plurality of kinds, including the earlier enumerated kinds, the control message belongs. The path ID indicates the identifier of the new working path to be set up. The routing information specifies the route along which the new working path is to be set up, i.e., the route along which the working path setup message is to be transmitted. The data structure of the routing information may be the same as that of the routing information contained in the control command transmitted from the NMS 10. The bandwidth information specifies the allowable bandwidth requested of the new working path. The protection path ID indicates the identifier of the protection path used to back up the new working path.

In step S32, the working path message processing unit 41 performs processing to set up the new working path in a manner similar to that described in connection with step S3 in FIG. 11. After that, the working path message processing unit 41 proceeds to step S50.

In step S50, the working path message processing unit 41 determines whether the node apparatus N1 is the endpoint of the route specified by the routing information carried in the working path setup message. If the node apparatus N1 is the endpoint (Y in step S50), the working path message processing unit 41 causes the process to terminate. If the node apparatus N1 is not the endpoint (N in step S50), then in step S51 the working path message processing unit 41 instructs the control message transmitting unit 22 to transfer the working path setup message to the adjacent node apparatus specified as the downstream node by the routing information, and thereafter causes the process to terminate.

In step S33, the control message receiving unit 21 determines whether the received control message is a working path change message or not. If the received control message is not a working path change message (N in step S33), the control message receiving unit 21 proceeds to step S35.

If the received message is a working path change message (Y in step S33), the control message receiving unit 21 passes the working path change message to the working path message processing unit 41, and the process proceeds to step S34. FIG. 20 is a diagram illustrating one example of the data structure of the instruction information contained in the working path change message. The data structure of the instruction information contained in the working path change message includes fields for storing "kind code," "path ID," "routing information," and "bandwidth information."

The path ID indicates the identifier of the working path to be changed. The routing information specifies the route through which the working path to be changed passes, that is, the route along which the working path change message is to be transmitted. The bandwidth information specifies the allowable bandwidth requested of the working path to be changed.

In step S34, the working path message processing unit 41 performs processing to change the working path in a manner similar to that described in connection with step S5 in FIG. 11. After that, the working path message processing unit 41 proceeds to step S50.

In step S50, the working path message processing unit 41 determines whether the node apparatus N1 is the endpoint of the route specified by the routing information carried in the working path change message. If the node apparatus N1 is the endpoint (Y in step S50), the working path message processing unit 41 causes the process to terminate. If the node apparatus N1 is not the endpoint (N in step S50), then in step S51 the working path message processing unit 41 instructs the control message transmitting unit 22 to transfer the working path change message to the adjacent node apparatus specified as the downstream node by the routing information, and thereafter causes the process to terminate.

In step S35, the control message receiving unit 21 determines whether the received control message is a working path delete message or not. If the received control message is not a working path delete message (N in step S35), the control message receiving unit 21 proceeds to step S37.

If the received message is a working path delete message (Y in step S35), the control message receiving unit 21 passes the working path delete message to the working path message processing unit 41, and the process proceeds to step S36. The data structure of the instruction information contained in the working path delete message may be the same as that depicted in FIG. 20. The path ID indicates the identifier of the working path to be deleted. The routing information specifies the route through which the working path to be deleted passes, i.e., the route along which the working path delete message is to be transmitted.

In step S36, the working path message processing unit 41 performs processing to delete the working path in a manner similar to that described in connection with step S7 in FIG. 11. After that, the working path message processing unit 41 proceeds to step S50.

In step S50, the working path message processing unit 41 determines whether the node apparatus N1 is the endpoint of the route specified by the routing information carried in the working path delete message. If the node apparatus N1 is the endpoint (Y in step S50), the working path message processing unit 41 causes the process to terminate. If the node apparatus N1 is not the endpoint (N in step S50), then in step S51 the working path message processing unit 41 instructs the control message transmitting unit 22 to transfer the working path delete message to the adjacent node apparatus specified as the downstream node by the routing information, and thereafter causes the process to terminate.

In step S37, the control message receiving unit 21 determines whether the received control message is a shared path setup message or not. If the received control message is not a shared path setup message (N in step S37), the control message receiving unit 21 proceeds to step S39.

If the received message is a shared path setup message (Y in step S37), the control message receiving unit 21 passes the shared path setup message to the shared path message processing unit 40, and the process proceeds to step S38. The data structure of the instruction information contained in the shared path setup message may be the same as that depicted in FIG. 20. The path ID indicates the identifier of the new shared path to be set up. The routing information specifies the route through which the new shared path passes, that is, the route along which the shared path setup message is to be transmitted. The bandwidth information specifies the allowable bandwidth requested of the new shared path.

In step S38, the shared path message processing unit 40 performs processing to set up the new shared path in a manner similar to that described in connection with step S9 in FIG. 11. After that, the shared path message processing unit 40 proceeds to step S50.

In step S50, the shared path message processing unit 40 determines whether the node apparatus N1 is the endpoint of the route specified by the routing information carried in the shared path setup message. If the node apparatus N1 is the endpoint (Y in step S50), the shared path message processing unit 40 causes the process to terminate. If the node apparatus N1 is not the endpoint (N in step S50), then in step S51 the shared path message processing unit 40 instructs the control message transmitting unit 22 to transfer the shared path setup message to the adjacent node apparatus specified as the downstream node by the routing information, and thereafter causes the process to terminate.

In step S39, the control message receiving unit 21 determines whether the received control message is a shared path change message or not. If the received control message is not a shared path change message (N in step S39), the control message receiving unit 21 proceeds to step S41.

If the received message is a shared path change message (Y in step S39), the control message receiving unit 21 passes the shared path change message to the shared path message processing unit 40, and the process proceeds to step S40. The data structure of the instruction information contained in the shared path change message may be the same as that depicted in FIG. 20. The path ID indicates the identifier of the shared path to be changed. The routing information specifies the route through which the shared path to be changed passes, i.e., the route along which the shared path change message is to be transmitted. The bandwidth information specifies the new allowable bandwidth requested of the shared path to be changed.

In step S40, the shared path message processing unit 40 performs processing to change the shared path in a manner similar to that described in connection with step S11 in FIG. 11. After that, the shared path message processing unit 40 proceeds to step S50.

In step S50, the shared path message processing unit 40 determines whether the node apparatus N1 is the endpoint of the route specified by the routing information carried in the shared path change message. If the node apparatus N1 is the endpoint (Y in step S50), the shared path message processing unit 40 causes the process to terminate. If the node apparatus N1 is not the endpoint (N in step S50), then in step S51 the shared path message processing unit 40 instructs the control message transmitting unit 22 to transfer the shared path change message to the adjacent node apparatus specified as the downstream node by the routing information, and thereafter causes the process to terminate.

In step S41, the control message receiving unit 21 determines whether the received control message is a shared path delete message or not. If the received control message is not a shared path delete message (N in step S41), the control message receiving unit 21 proceeds to step S43.

If the received message is a shared path delete message (Y in step S41), the control message receiving unit 21 passes the shared path delete message to the shared path message processing unit 40, and the process proceeds to step S42. The data structure of the instruction information contained in the shared path delete message may be the same as that depicted in FIG. 20. The path ID indicates the identifier of the shared path to be deleted. The routing information specifies the route through which the shared path to be deleted passes, i.e., the route along which the shared path delete message is to be transmitted.

In step S42, the shared path message processing unit 40 performs processing to delete the shared path in a manner similar to that described in connection with step S13 in FIG. 11. After that, the shared path message processing unit 40 proceeds to step S50.

In step S50, the shared path message processing unit 40 determines whether the node apparatus N1 is the endpoint of the route specified by the routing information carried in the shared path delete message. If the node apparatus N1 is the endpoint (Y in step S50), the shared path message processing unit 40 causes the process to terminate. If the node apparatus N1 is not the endpoint (N in step S50), then in step S51 the shared path message processing unit 40 instructs the control message transmitting unit 22 to transfer the shared path delete message to the adjacent node apparatus specified as the downstream node by the routing information, and thereafter causes the process to terminate.

In step S43, the control message receiving unit 21 determines whether the received control message is a protection path setup message or not. If the received control message is not a protection path setup message (N in step S43), the control message receiving unit 21 proceeds to step S45.

If the received message is a protection path setup message (Y in step S43), the control message receiving unit 21 passes the protection path setup message to the protection path message processing unit 42, and the process proceeds to step S44. FIG. 21 is a diagram illustrating one example of the data structure of the instruction information contained in the protection path setup message. The data structure of the instruction information contained in the protection path setup message includes fields for storing "kind code," "path ID," "routing information," "bandwidth information," "working path ID," and "shared path ID."

The path ID indicates the identifier of the new protection path to be set up. The routing information specifies the route along which the new protection path is to be set up, i.e., the route along which the protection path setup message is to be transmitted. The working path ID indicates the identifier of the working path to be backed up by the new protection path. The shared path ID indicates the identifier of the shared path whose bandwidth resources are to be used by the new protection path.

In step S44, the protection path message processing unit 42 performs processing to set up the new protection path in a manner similar to that described in connection with step S15 in FIG. 12. After that, the protection path message processing unit 42 proceeds to step S50.

In step S50, the protection path message processing unit 42 determines whether the node apparatus N1 is the endpoint of the route specified by the routing information carried in the protection path setup message. If the node apparatus N1 is the endpoint (Y in step S50), the protection path message processing unit 42 causes the process to terminate. If the node apparatus N1 is not the endpoint (N in step S50), then in step S51 the protection path message processing unit 42 instructs the control message transmitting unit 22 to transfer the protection path setup message to the adjacent node apparatus specified as the downstream node by the routing information, and thereafter causes the process to terminate.

In step S45, the control message receiving unit 21 determines whether the received control message is a protection path change message or not. If the received control message is not a protection path change message (N in step S45), the control message receiving unit 21 proceeds to step S47.

If the received message is a protection path change message (Y in step S45), the control message receiving unit 21 passes the protection path change message to the protection path message processing unit 42, and the process proceeds to step S46. FIG. 22 is a diagram illustrating one example of the data structure of the instruction information contained in the protection path change message. The data structure of the instruction information contained in the protection path change message includes fields for storing "kind code," "path ID," "routing information," "bandwidth information," and "shared path ID."

The path ID indicates the identifier of the protection path to be changed. The routing information specifies the route through which the protection path to be changed passes, that is, the route along which the protection path change message is to be transmitted. The shared path ID indicates the identifier of the shared path whose bandwidth resources are used by the protection path to be changed.

In step S46, the protection path message processing unit 42 performs processing to change the protection path in a manner similar to that described in connection with step S17 in FIG. 12. After that, the protection path message processing unit 42 proceeds to step S50.

In step S50, the protection path message processing unit 42 determines whether the node apparatus N1 is the endpoint of the route specified by the routing information carried in the protection path change message. If the node apparatus N1 is the endpoint (Y in step S50), the protection path message processing unit 42 causes the process to terminate. If the node apparatus N1 is not the endpoint (N in step S50), then in step S51 the protection path message processing unit 42 instructs the control message transmitting unit 22 to transfer the protection path change message to the adjacent node apparatus specified as the downstream node by the routing information, and thereafter causes the process to terminate.

In step S47, the control message receiving unit 21 determines whether the received control message is a protection path delete message or not. If the received control message is not a protection path delete message (N in step S47), the control message receiving unit 21 proceeds to step S49.

If the received message is a protection path delete message (Y in step S47), the control message receiving unit 21 passes the protection path delete message to the protection path message processing unit 42, and the process proceeds to step S48. The data structure of the instruction information contained in the protection path delete message may be the same as that depicted in FIG. 20.

The path ID indicates the identifier of the protection path to be deleted. The routing information specifies the route through which the protection path to be deleted passes, i.e., the route along which the protection path delete message is to be transmitted.

In step S46, the protection path message processing unit 42 performs processing to delete the protection path in a manner similar to that described in connection with step S19 in FIG. 12. After that, the protection path message processing unit 42 proceeds to step S50.

In step S50, the protection path message processing unit 42 determines whether the node apparatus N1 is the endpoint of the route specified by the routing information carried in the protection path delete message. If the node apparatus N1 is the endpoint (Y in step S50), the protection path message processing unit 42 causes the process to terminate. If the node apparatus N1 is not the endpoint (N in step S50), then in step S51 the protection path message processing unit 42 instructs the control message transmitting unit 22 to transfer the protection path delete message to the adjacent node apparatus specified as the downstream node by the routing information, and thereafter causes the process to terminate.

Figure 23:
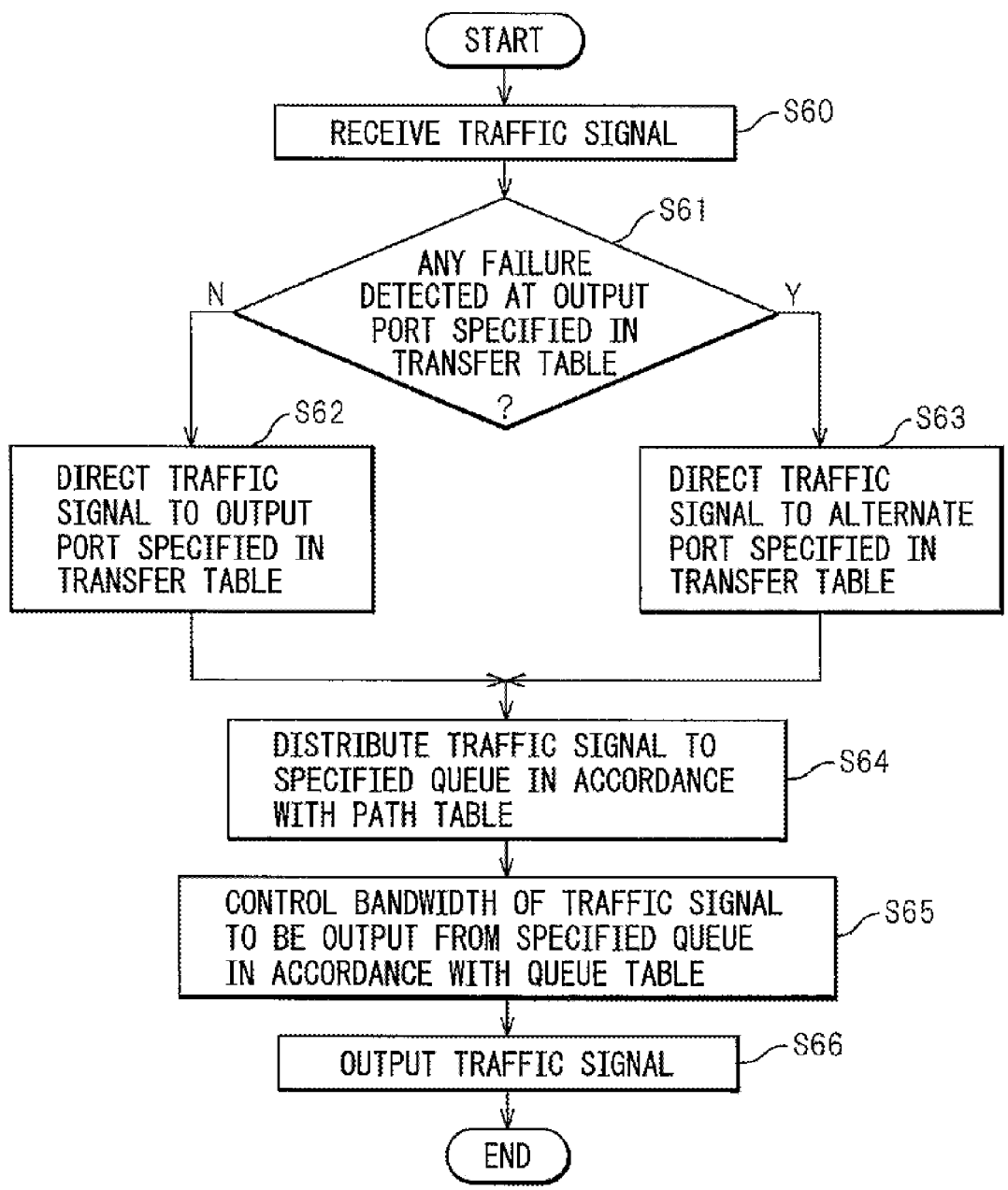
FIG. 23 is a flowchart illustrating an example of a bandwidth control method for protection path traffic.

FIG. 23 is a flowchart illustrating an example of a bandwidth control method for protection path traffic. In step S60, the node apparatus N1 receives the traffic signal. In step S61, the switch unit 11 refers to the path identifier contained in the header information of the received traffic signal. The switch unit 11 identifies the output port to which the received traffic signal is to be directed, based on the contents of the output port field of the entry stored in the transfer table T1 for that path identifier.

The switch unit 11 determines whether or not the failure detection unit 15 or 16 has detected any failure at the identified output port. If no failure is detected (N in step S61), the switch unit 11 proceeds to step S62. If any failure has been detected (Y in step S61), the switch unit 11 proceeds to step S63.

In step S62, the switch unit 11 directs the traffic signal to the output port identified in step S61. On the other hand, in step S63, the switch unit 11 directs the traffic signal to the port specified in the alternate port field of the entry stored in the transfer table T1 for the path identifier contained in the header information of the traffic signal. With the above steps S61 to S63, the switch unit 11 performs failure recovery by wrapping control when a failure has occurred at the output port.

In step S64, the distributor 60 in the bandwidth control unit 13 or 14 that received the traffic signal from the switch unit 11 refers to the path identifier contained in the header information of the traffic signal received from the switch unit 11, and distributes the traffic signal to the queue specified for that path identifier in the path table T3 from among the plurality of queues 61.

The queue specified for any given protection path in the path table T3 is the queue specified in the shared path table T4 for the shared path whose bandwidth resources are used by that protection path. Accordingly, the traffic signal arriving from the protection path is distributed to the queue specified in the shared path table T4 for the shared path whose bandwidth resources are used by that protection path.

When a plurality of protection paths are specified by the protection path setup or protection path change command or the protection path setup or protection path change message so that the plurality of protection paths use the bandwidth resources of the same shared path, the traffic signal arriving from any of these protection paths is distributed to the same queue. For example, in the example of the path table T3 depicted in FIG. 8, the traffic signals arriving from the protection paths A' and B' are both distributed to the queue 1 specified for the shaped path P.

In step S65, the scheduler 62 controls the amount of traffic to be output from the queue in accordance with the allowable bandwidth specified for a corresponding one of the plurality of queues 61 in the queue table T2.

The allowable bandwidth specified in the queue table T2 for the queue to which the protection path is allocated is given by the maximum total bandwidth value specified in the shared path setup or shared path change command or the shared path setup or shared path change message for the shared path whose bandwidth resources are used by that protection path. More specifically, when creating the shared path setup command to be transmitted to the node apparatus N1, the largest value among the per-link total values of the bandwidths that the existing working paths use on the respective links L1 to L6, i.e., the maximum total bandwidth value, is specified as the allowable bandwidth.

With the above steps S64 and S65, the traffic on the protection path is controlled so that the traffic on the shared path does not exceed the maximum total bandwidth value specified for the shared path whose bandwidth resources are used by that protection path. When a plurality of protection paths are specified so as to share the bandwidth resources of the same shared path, control is performed so that the total amount of traffic on these protection paths does not exceed the maximum total bandwidth value. In step S66, the bandwidth control unit 13 or 14 delivers the traffic controlled by the scheduler 62 to the designated output port for output.

According to the present embodiment, bandwidth resources for a plurality of protection paths are reserved as the bandwidth resources of the shared path to be shared by the plurality of protection paths. The maximum total bandwidth value, i.e., the largest value among the per-link total values of the bandwidths that the working paths use on the respective links L1 to L6, is used as the allowable bandwidth for the bandwidth resources. As a result, according to the present embodiment, only the minimum necessary bandwidth to achieve the protection paths having the same bandwidth as the working paths is reserved for the protection paths, eliminating the need to reserve a larger bandwidth than necessary as would be the case with the prior art.

The number of shared paths P is not limited to one, but the ring network NT may be provided with a plurality of shared paths. That is, the shared path table T4 may include entries for a plurality of shared paths, and a plurality of queues corresponding to the respective shared paths may be created.

The bandwidth control units 13 and/or 14 may provide priority among the plurality of shared paths according to the priorities of the working paths backed up by the respective shared paths. Then, in accordance with the thus provided priority, the bandwidth control units 13 and/or 14 may reduce the allowable bandwidth to be reserved for each shared path, i.e., the bandwidth of the traffic to be output from the queue used to control the traffic of the protection path that uses the bandwidth resources of the shared path.

More specifically, in accordance with the prescribed priority predetermined among the respective shared paths, the bandwidth control units 13 and/or 14 may reduce the allowable bandwidth to be reserved for each shared path to a value smaller than the maximum total bandwidth value determined for each shared path. For example, a coefficient may be predefined according to the priority in such a manner that the coefficient becomes smaller as the priority increases. Then, the bandwidth control units 13 and/or 14 may determine the allowable bandwidth to be reserved for each shared path, by multiplying the maximum total bandwidth value with the coefficient. The bandwidth control units 13 and/or 14 may fix the allowable bandwidth for a selected one of the plurality of shared paths.

In the above embodiment, the allowable bandwidth to be reserved for the shared path has been specified by the shared path setup command or the shared path change command from the NMS 10. In the following embodiment, on the other hand, when a new working path is setup, each of the nodes N1 to N6 adaptively changes the allowable bandwidth to be reserved for the shared path.

Figure 24:
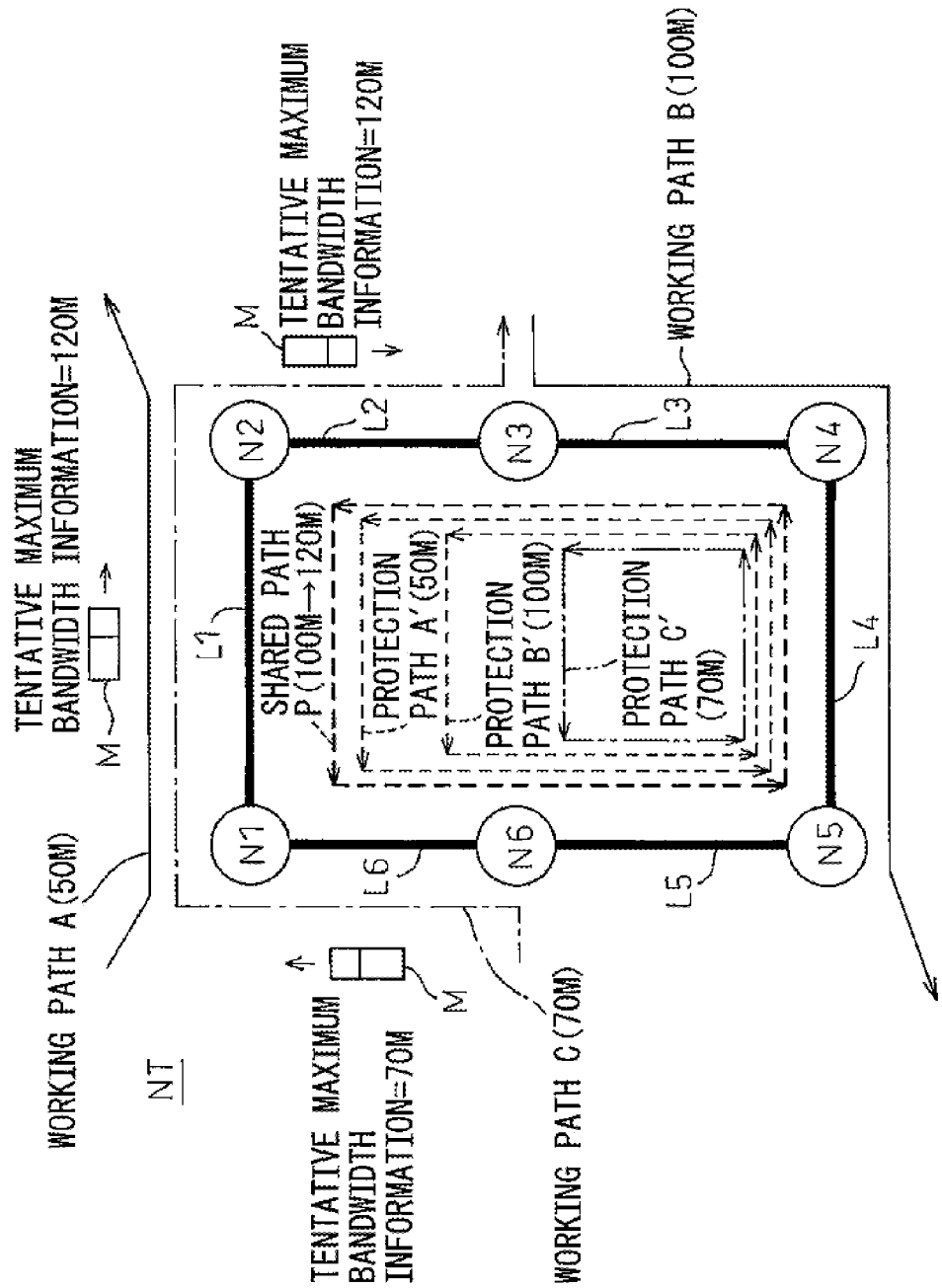
FIG. 24 is an explanatory diagram illustrating an example of a method for changing the allowable bandwidth of the shared path in response to the setup of a new working path.

FIG. 24 is an explanatory diagram illustrating an example of a method for changing the allowable bandwidth of the shared path in response to the setup of a new working path. In the illustrated ring network NT, working paths A and B having bandwidths of 50 Mbps and 100 Mbps, respectively, are set up. The working path A is set up from the startpoint node apparatus N1 to the endpoint node N2 by passing through the node apparatuses N1 and N2 in this order. The working path B is set up from the startpoint node apparatus N3 to the endpoint node N5 by passing through the node apparatuses N3, N4, and N5 in this order. The maximum total bandwidth value is 100 Mbps which is used on the links L3 and L4 through which the working path B passes. Therefore, bandwidth resources equivalent to 100 Mbps are reserved for the shared path P.

Consider the case where an additional working path C having a bandwidth of 70 Mbps is set up here. The working path C is set up from the startpoint node apparatus N6 to the endpoint node N3 by passing through the node apparatuses N6, N1, N2, and N3 in this order. When the working path C is set up, the maximum total bandwidth value is 120 Mbps which is used on the link L1 where the working paths A and C overlap. It therefore becomes necessary to change the bandwidth resources of the shared path P from 100 Mbps to 120 Mbps.

In the present embodiment, tentative maximum bandwidth information is added in the instruction information contained in the working path setup message M. FIG. 25 is a diagram illustrating a second example of the data structure of the instruction information contained in the working path setup message. The node apparatus N6 at the startpoint of the working path setup message M for setting up the working path C creates the working path setup message M. The node apparatus N6 specifies as the value of the tentative maximum bandwidth information the sum of the bandwidths that the current working path and the new working path C respectively use on the link L6 that is connected to the node apparatus N6 and that lies along the route of the working path C. In the illustrated example, the value of the tentative maximum bandwidth information is 70 Mbps.

The working path setup message M from the node apparatus N6 is received at the next node apparatus N1 on the working path C. The node apparatus N1 calculates the sum of the bandwidths that the current working path and the new working path C respectively use on the link L1 that is connected to the node apparatus N1 and that lies along the working path C. The sum is calculated as 50 Mbps+70 Mbps=120 Mbps. The node apparatus N1 compares the sum with the tentative maximum bandwidth information contained in the working path setup message M received from the node apparatus N6, and takes the larger value as the value of the tentative maximum bandwidth information. The value of the tentative maximum bandwidth information is now 120 Mbps. The same processing is repeated at the next node apparatus N2 on the working path C. The value of the tentative maximum bandwidth information remains at 120 Mbps.

The node apparatus N3 at the endpoint of the working path C receives the working path setup message M from the node apparatus N2. The node apparatus N3 compares the value of 120 Mbps carried as the tentative maximum bandwidth information in the received working path setup message M with the value of 100 Mbps currently specified as the allowable bandwidth in the queue table T2 for the shared path P.

If the value of the tentative maximum bandwidth information contained in the received working path setup message M is larger than the allowable bandwidth currently specified in the queue table T2, the node apparatus N3 updates the value of the allowable bandwidth, specified in the queue table T2 for the shared path P, to the value of the tentative maximum bandwidth information. In the present embodiment, since the value of the tentative maximum bandwidth information, 120 Mbps, is larger than the currently specified allowable bandwidth value of 100 Mbps, the value of the allowable bandwidth specified in the queue table T2 for the shared path P is updated to 120 Mbps.

At this time, a shared path change message for changing the value of the allowable bandwidth requested of the shared path P to the value of the tentative maximum bandwidth information is transmitted from the node apparatus N3 to the node apparatus N2 that transmitted the working path setup message to the node apparatus N3. When creating the shared path change message, the node apparatus N3 includes therein the routing information that specifies the route that passes through the node apparatuses N3, N2, N1, N6, N5, N4, and N3 in this order. With this specification, the shared path change message is transmitted to all the node apparatuses N1 to N6, and the value of the allowable bandwidth specified in the queue table T2 for the shared path P is updated to 120 Mbps at each of these node apparatuses.

Further, a protection path setup message for setting up a new protection path C' used to back up the working path C is transmitted from the node apparatus N3 to the node apparatus N2 that transmitted the working path setup message to the node apparatus N3. In the protection path setup message, the node apparatus N3 specifies the shared path P as the shared path whose bandwidth resources are to be used by the protection path C. When creating the protection path setup message, the node apparatus N3 includes therein the routing information that specifies the route that passes through the node apparatuses N3, N2, N1, N6, N5, N4, and N3 in this order. With this specification, the new protection path C' that transmits the signal in the opposite direction to the signal transporting direction of the working path C is set up so as to cycle around the ring network NT.

Figure 26:
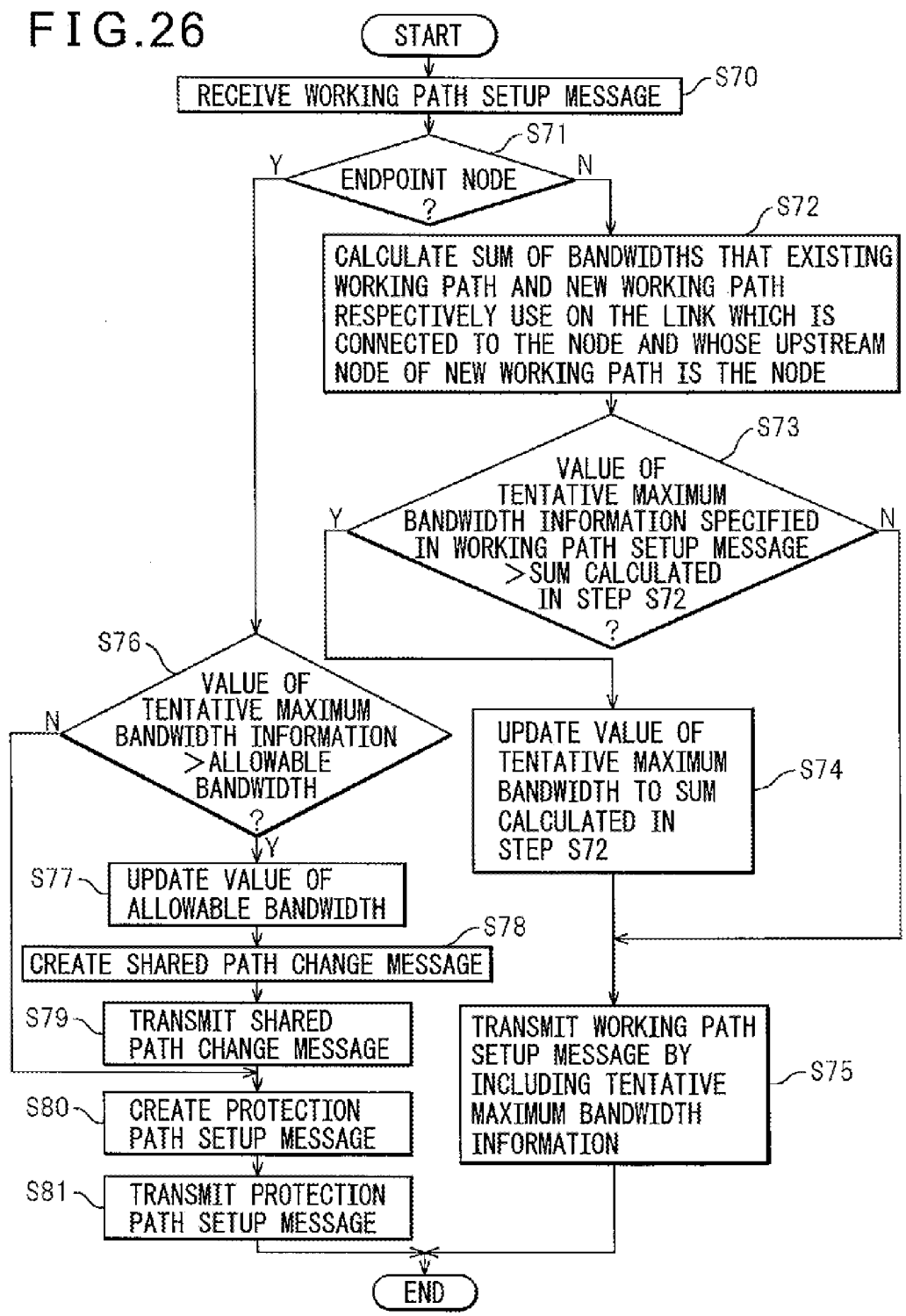
FIG. 26 is a flowchart illustrating one example of the processing performed in response to the reception of the working path setup message.

FIG. 26 is a flowchart illustrating one example of the processing that the node apparatus N1 performs in response to the reception of the working path setup message in accordance with the method of FIG. 24 for changing the allowable bandwidth of the shared path. In step S70, the node apparatus N1 receives the working path setup message. For convenience of explanation, it is assumed that the new path to be set up by this working path setup message is a path that transmits the signal in the clockwise direction around the network NT as depicted in FIG. 24.

In step S71, based on the routing information contained in the received working path setup message, the working path message processing unit 41 determines whether the node apparatus 1 is the endpoint node of the working path setup message. If the node apparatus 1 is the endpoint node (Y in step S71), the working path message processing unit 41 proceeds to step S76. If the node apparatus 1 is not the endpoint node (N in step S71), the working path message processing unit 41 proceeds to step S72.

In step S72, the working path message processing unit 41 calculates the sum of the bandwidths that the existing working path and the new working path respectively use on the link L1 which is connected to the node apparatus N1, and whose upstream node of the new working path is the node apparatus N1. In step S73, the working path message processing unit 41 compares the sum calculated in step S72 with the value of the tentative maximum bandwidth information contained in the received working path setup message.

If the sum calculated in step S72 is not larger than the value of the tentative maximum bandwidth information (N in step S73), the working path message processing unit 41 proceeds to step S75. If the sum calculated in step S72 is larger than the value of the tentative maximum bandwidth information (Y in step S73), then in step S74 the working path message processing unit 41 updates the value of the tentative maximum bandwidth information to the sum calculated in step S72. After that, the working path message processing unit 41 proceeds to step S75.

In step S75, the working path message processing unit 41 transmits the working path setup message to the next node apparatus N2 by including therein the sum calculated in step S72 or the value of the received tentative maximum bandwidth information, whichever is larger, as the tentative maximum bandwidth information.

In step S76, the working path message processing unit 41 compares the value of the tentative maximum bandwidth information contained in the received working path setup message with the allowable bandwidth currently specified in the queue table T2 for the shared path. If the value of the tentative maximum bandwidth information contained in the received working path setup message is not larger than the currently specified allowable bandwidth (N in step S76), the node apparatus N1 proceeds to step S80.

If the value of the tentative maximum bandwidth information contained in the received working path setup message is larger than the currently specified allowable bandwidth (Y in step S76), the working path message processing unit 41 proceeds to step S77. In step S77, the working path message processing unit 41 updates the value of the allowable bandwidth, currently specified in the queue table T2 for the shared path, to the value of the tentative maximum bandwidth information contained in the received working path setup message.

In step S78, the shared path message processing unit 40 creates a shared path change message for changing the value of the shared bandwidth reserved for the shared path to the value of the tentative maximum bandwidth information contained in the received working path setup message. When creating the shared path change message, the shared path message processing unit 40 includes therein the routing information that cycles around the ring network in the opposite direction to the direction of the new working path being set up. In step S79, the control message transmitting unit 22 transmits the shared path change message created in step S78 to the adjacent node apparatus that transmitted the working path setup message.

In step S80, the protection path message processing unit 42 creates a protection path setup message for setting up a new protection path used to back up the new working path being set up. In the protection path setup message, the protection path message processing unit 42 specifies the shared path whose bandwidth resources are to be used by the protection path. When creating the protection path setup message, the protection path message processing unit 42 includes therein the routing information that cycles around the ring network in the opposite direction to the direction of the new working path being set up. In step S81, the control message transmitting unit 22 transmits the shared path change message created in step S80 to the adjacent node apparatus that transmitted the working path setup message.

According to the present embodiment, when a change occurs in bandwidth usage due to the setting of a new working path, each node apparatus can automatically change the shared path bandwidth without the NMS 10, etc. having to perform setup operations.

While the above embodiment has dealt with the case where the allowable bandwidth of the shared path is changed when a working path is set up, it will also be recognized that the allowable bandwidth of the shared path may be reduced in a similar manner when a working path is deleted.

According to the apparatus, system, and method discussed herein, the utilization efficiency of bandwidth resources improves because the wasteful reservation of bandwidth resources, which would arise if a protection path were provided independently for each of a plurality of working paths, can be avoided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A protection path bandwidth control method for a ring network in which a plurality of node apparatuses are connected in a ring configuration, and in which, to provide protection for a working path passing through said ring network, a protection path is provided that cycles around said ring network and that transports a signal in a direction opposite to a signal transporting direction of said working path and, in the event of a failure of said working path, a node apparatus adjacent to said failure loops back the signal flowing on said working path onto said protection path, wherein at each of said node apparatuses, a maximum total bandwidth value, which represents the largest value among per-link total values of bandwidths that a plurality of working paths use on respective links connecting between said respective node apparatuses, is stored in a prescribed storing unit as an allowable bandwidth for a shared path provided to be shared among said plurality of working paths, as a protection path to backup said plurality of working paths, at each of said node apparatuses, the bandwidth of traffic flowing on said protection path is controlled in accordance with said allowable bandwidth, and said protection path bandwidth control method comprising:

receiving a working path setup message requesting to set up a new working path that passes through one of said node apparatuses from one of adjacent node apparatuses adjacent to said one of node apparatus;

transmitting said working path setup message to the other one of said adjacent node apparatuses adjacent to said one of node apparatus;

calculating a sum of bandwidths that an existing working path and said new working path respectively use on a link that connects between said one of node apparatus and said adjacent node apparatus and through which said new working path passes; and updating said received working path setup message so as to include said sum as tentative maximum bandwidth information into said working path setup message for transmission to said other adjacent node apparatus when said sum calculated by said bandwidth calculating unit is larger than the bandwidth indicated by the tentative maximum bandwidth information contained in said received working path setup message.

2. A node apparatus in a ring network in which a plurality of node apparatuses are connected in a ring configuration, and in which, to provide protection for a working path passing through said ring network, a protection path is provided that cycles around said ring network and that transports a signal in a direction opposite to a signal transporting direction of said working path and, in the event of a failure of said working path, a node apparatus adjacent to said failure loops back the signal flowing on said working path onto said protection path, said node apparatus comprising:

an allowable bandwidth storing unit which stores a maximum total bandwidth value, which represents the largest value among per-link total values of bandwidths that a plurality of working paths use on respective links connecting between said respective node apparatuses, as an allowable bandwidth for a shared path provided to be shared among said plurality of working paths, as a protection path to backup said plurality of working paths;

a bandwidth control unit which controls the bandwidth of traffic flowing on said protection path, in accordance with said allowable bandwidth;

a working path setup message receiving unit which receives, from one of adjacent node apparatuses adjacent to said node apparatus, a working path setup message requesting to set up a new working path that passes through said node apparatus;

a working path setup message transmitting unit which transmits said working path setup message to the other one of said adjacent node apparatuses adjacent to said node apparatus;

a bandwidth calculating unit which calculates a sum of bandwidths that an existing working path and said new working path respectively use on a link that connects between said node apparatus and said adjacent node apparatus and through which said new working path passes; and a working path message updating unit which updates said received working path setup message so as to include said sum as tentative maximum bandwidth information into said working path setup message for transmission to said other adjacent node apparatus when said sum calculated by said bandwidth calculating unit is larger than the bandwidth indicated by the tentative maximum bandwidth information contained in said received working path setup message.

3. A node apparatus according to claim 2, further comprising:
- a shared path change message creating unit which creates a shared path change message containing said tentative maximum bandwidth information when the bandwidth indicated by the tentative maximum bandwidth information contained in said working path setup message received by said working path setup message receiving unit is larger than said allowable bandwidth stored in said bandwidth storing unit;
- a shared path change message transmitting unit which transmits said shared path change message to the adjacent node apparatus that transmitted said working path setup message;
- a shared path change message receiving unit which receives said shared path change message transmitted from one of said adjacent node apparatuses adjacent to said node apparatus; and
- a shared path change message processing unit which changes said allowable bandwidth stored in said bandwidth storing unit to a value indicated by said tentative maximum bandwidth information contained in said shared path change message received by said shared path change message receiving unit, and wherein
- when said shared path change message transmitted from said one adjacent node apparatus is received, said shared path change message transmitting unit transmits said shared path change message to said other adjacent node apparatus adjacent to said node apparatus.

4. A node apparatus according to claim 2, further comprising:
- a protection path setup message creating unit which creates a protection path setup message specifying said new working path and a shared path to be used as a protection path for said new working path when said node apparatus is an endpoint node of said new working path whose setup is requested by said working path setup message received by said working path setup message receiving unit;
- a protection path setup message transmitting unit which transmits said protection path setup message to the adjacent node apparatus that transmitted said working path setup message; and
- a protection path setup message receiving unit which receives said protection path setup message transmitted from one of said adjacent node apparatuses adjacent to said node apparatus, and wherein
- said bandwidth control unit controls the bandwidth of the protection path provided to back up said new working path specified in said protection path setup message, by using a queue to be used for bandwidth control of said shared path specified in said protection path setup message received by said protection path setup message receiving unit, and
- when said protection path setup message transmitted from said one adjacent node apparatus is received, said protection path setup message transmitting unit transmits said protection path setup message to said other adjacent node apparatus adjacent to said node apparatus.

5. A ring network comprising a plurality of node apparatuses according to claim 2, and a plurality of signal transmission media connecting between said respective node apparatuses, said ring network being constructed by connecting said plurality of node apparatuses in a ring configuration, wherein
- a protection path is provided that cycles around said ring network and that transports a signal in a direction opposite to a signal transporting direction of a working path in order to provide protection for said working path passing through said ring network, and
- a node apparatus adjacent to said failure loops back the signal flowing on said working path onto said protection path, in the event of a failure of said working path.

\* \* \* \* \*